United States Patent
Chen

(10) Patent No.: US 8,179,503 B2
(45) Date of Patent: May 15, 2012

(54) PIXEL STRUCTURE, 3D IMAGE/MULTIPLE VIEW LIQUID CRYSTAL DISPLAY DEVICE AND METHOD OF MANUFACTURING THE SAME

(75) Inventor: Chih-Chiang Chen, Taipei Hsien (TW)

(73) Assignee: Acer Incorporated, Taipei Hsien (TW)

( * ) Notice: Subject to any disclaimer, the term of this patent is extended or adjusted under 35 U.S.C. 154(b) by 456 days.

(21) Appl. No.: 12/421,752

(22) Filed: Apr. 10, 2009

(65) Prior Publication Data

US 2010/0110317 A1     May 6, 2010

(30) Foreign Application Priority Data

Nov. 6, 2008    (TW) ............................... 97142831 A

(51) Int. Cl.
     *G02F 1/1335*     (2006.01)
(52) U.S. Cl. ........................................................ 349/113
(58) Field of Classification Search .................... None
     See application file for complete search history.

(56) References Cited

U.S. PATENT DOCUMENTS

2002/0180910 A1* 12/2002 Umemoto et al. ............ 349/113
2003/0160922 A1* 8/2003 Noritake ....................... 349/113
2003/0206258 A1* 11/2003 Ting et al. ..................... 349/113
2005/0213001 A1* 9/2005 Ueki et al. .................... 349/113

FOREIGN PATENT DOCUMENTS

KR    20040051073    6/2004
KR    20080086118    9/2008

OTHER PUBLICATIONS

Korean Office Action dated Dec. 20, 2010 for 10-2009-0059132, which is a corresponding Korean application, that cites KR20080086118 (A) and KR20040051073 (A).

* cited by examiner

*Primary Examiner* — Tina Wong
(74) *Attorney, Agent, or Firm* — WPAT, P.C.; Anthony King

(57) ABSTRACT

A pixel structure, a 3D image/multiple view liquid crystal display device and a method of manufacturing the same are provided. The pixel structure comprises a first substrate, a second substrate being parallel with the first substrate, a liquid crystal layer disposed between the first substrate and the second substrate, a reflecting structure, and a light angle control structure. The reflecting structure is disposed on the first substrate, and the light angle control structure is disposed on the second substrate. The light angle control structure is configured to reflect a light entering from the first substrate to the reflecting structure, and the reflecting structure is configured to reflect the light again such that the light exits from the pixel structure in a predetermined direction.

14 Claims, 25 Drawing Sheets

PIXEL STRUCTURE, 3D IMAGE/MULTIPLE VIEW LIQUID CRYSTAL DISPLAY DEVICE AND METHOD OF MANUFACTURING THE SAME

BACKGROUND OF THE INVENTION

1. Field of the Invention

The present invention relates to a liquid crystal display device; in particular, to an integrated stereo image liquid crystal display device and/or multiple view liquid display device.

2. Description of Related Art

Generally speaking, human left and right eyes separate from each other by approximately 6.5 cm, and thus there exist some minor differences in the two views of exterior world perceived by both eyes. Such two views are then passed to the brain and merged into a stereo image, enabling the perceived dimensional sense. This principle of using parallax in two eyes to create stereo image has been broadly applied in many 3D image display devices.

Currently available 3D image display devices can be roughly classified into two types, in which one type of such display devices needs to be outfitted with the stereo glasses to allow to generate stereo images (as shown in FIGS. 1A and 1B), while the other one, referred as naked-eye direct view stereo image displayer, needs not such glasses (as shown in FIGS. 2A and 2B). FIG. 1A shows a conventional projecting stereo display system, commonly applied in playing 3D stereo films. The projector 110 and the projector 120 respectively projects an image vertical to the direction of light filtering on the screen 130 at the same time, so the viewers, after having worn the stereo lens (such as shutter-typed or polarized lens), can see different images in left and right eyes, which images then being merged by the brain to enable perception of a stereo image. FIG. 1B depicts a stereo image displayer composed of two liquid crystal panels, wherein the first liquid crystal panel 140 is used to provide images in left and right eyes having the same polarization direction, and the second liquid crystal panel 150 is used to control different polarization direction of the images in the left and right eyes. Through the polarized lens 160, it is possible to respectively filter the images having different polarization directions to left and right eyes, allowing the brain to perceive a stereo image.

The naked-eye direct view stereo display technology free from stereo glasses, alternatively referred as Autostereoscopic 3D Display, uses the different views seen in an observer's left and right eyes due to slight angular difference between them to, at a certain suitable angle and distance, allow one eye to be located in a viewable area of one image while the other eye located in a viewable area of the other image, thereby, through the brain, merging the two images into a stereo image of a certain dimensional depth. Common direct view stereo displayers include the parallax barrier typed displayer and the cylindrical lens typed, as shown in FIGS. 2A and 2B.

FIG. 2A shows a diagram of the operation principle of a parallax barrier displayer comprising a liquid crystal panel 210 and a parallax barrier 220. The parallax barrier 220 is installed at the front side of the liquid crystal panel 210, and the vertical grading stripe on the parallax barrier 220 can be designed so as to precisely block the light passing through each pixel, thereby allocating the image to the right eye or the left eye. In other word, since the angles viewed from the right eye and the left eye differ, through the blockage of the parallax barrier 220, it is therefore possible to allow the right eye to see only a portion of pixels R in the liquid crystal panel 210 and the left eye to see the other portion of pixels L in the liquid crystal panel 210, thus enabling the left and right eyes to respectively see an independent image, finally merged by the brain to acquire the stereo image having 3D spatial depth. In addition to the usage with regards to stereo image display, through the adjustments on the distance x between the liquid crystal panel 210 and the parallax barrier 220, as well as on the location and/or size of each pixel in the liquid crystal panel 210, the parallax barrier displayer may be also applied as a multiple view display device. However, the defect of such a parallax barrier displayer lies in that the opaque parallax barrier also blocks out light output thereof, hence leading to unwanted reduction in brightness of the entire panel.

FIG. 2B shows a diagram of the operation principle of a cylindrical lens displayer comprising a liquid crystal panel 230 and a cylindrical lens layer 240. The cylindrical lens layer 240 is used to respectively refract the left and right pixels (L, R) in the liquid crystal panel 230 to the left and right eyes of a user to create a stereo image. Through the assistance of computers, it is possible to simulate the required array density, inclined angle and array arrangement angle and the like in the cylindrical lens layer 240. In general, the higher the array density in the cylindrical lens layer 240 is, the finer the image resolution can become; however, the effect of stereo perception may be accordingly compromised. On the other hand, problems such as image interference and Mura phenomenon may occur at the boundary between the liquid crystal panel 230 and the cylindrical lens layer 240.

Besides, both the parallax barrier displayer and the cylindrical lens displayer are required to install an additional parallax barrier or cylindrical lens layer outside the display panel, thus integral weight and thickness of the displayer will undesirably increase.

As a result, it is necessary to provide an integrated stereo display device and/or multiple view display device with preferable slimness as well as good reliability.

SUMMARY OF THE INVENTION

In view of the drawbacks existing in the prior art, the present invention provides a liquid crystal display device and a manufacturing method thereof, in which such a liquid crystal display device is allowed to display stereo images or multiple view images, and enables advantages such as slimness and high reliability.

According to one aspect of the present invention, a pixel structure is provided. Such a pixel structure comprises a first substrate, a second substrate parallel with the first substrate, a liquid crystal layer disposed between the first substrate and the second substrate, a reflecting structure and a light angle control structure. The reflecting structure is disposed on the first substrate, and the light angle control structure is disposed on the second substrate. The light angle control structure is configured to reflect a light entering from the first substrate to the reflecting structure, and the reflecting structure is configured to reflect the light coming from the light angle control structure such that the light exits from the pixel structure in a predetermined direction.

According to another aspect of the present invention, a pixel structure consisting of a transistor array substrate, a color filter substrate and a liquid crystal layer is provided. Such a pixel structure comprises a light angle control structure and a reflecting structure. The light angle control structure is configured to reflect a light to the reflecting structure, and the reflecting structure is configured to reflect the light coming from the light angle control structure such that the light exits from the pixel structure in a predetermined direction.

According to yet another aspect of the present invention, an optical component formed in a pixel structure consisting of a transistor array substrate, a color filter substrate and a liquid crystal layer is provided. Such an optical component comprises a light angle control structure and a reflecting structure. The light angle control structure is configured to reflect a light to the reflecting structure, and the reflecting structure is configured to reflect the light coming from the light angle control structure such that the light exits from the pixel structure in a predetermined direction.

According to still another aspect of the present invention, a pixel structure is provided. Such a pixel structure comprises a first sub-pixel unit, a first optical component, a second sub-pixel unit and a second optical component. The first sub-pixel unit has a first transistor and a first storage capacitor. The first optical component is disposed on the first sub-pixel unit and configured to guide a first light in a first predetermined direction. The second sub-pixel unit has a second transistor and a second storage capacitor. The second optical component is disposed on the second sub-pixel unit and configured to guide a second light in a second predetermined direction different from the first predetermined direction.

According to yet still another aspect of the present invention, a liquid crystal display device is provided. Such a liquid crystal display device comprises a liquid crystal panel, a display controller, a gate driving circuit and a data driving circuit. The liquid crystal panel comprises a plurality of above-said pixel structures, a plurality of gate lines and a plurality of data lines. The display controller is configured to receive and process image signals. The gate driving circuit is coupled to the display controller and configured to selectively drive the plurality of gate lines based on the processed image signals. The data driving circuit is coupled to the display controller and configured to selectively drive the plurality of data lines based on the processed image signals.

According to further still another aspect of the present invention, a method of manufacturing a color filter substrate is provided. Such a method comprises the following steps: providing a transparent substrate; forming a dark matrix on the transparent substrate; forming a bump structure on the transparent substrate; forming a reflecting metal layer on one surface of the bump structure; and forming a color filter layer on the transparent substrate which covers the dark matrix and the bump structure.

Other aspects of the present invention will be illustrated partially in the subsequent detailed descriptions, conveniently considered partially through the teachings thereof, or comprehended by means of the disclosed embodiments of the present invention. Various aspects of the present invention can be understood and accomplished by using the components and combinations specifically pointed out in the following claims. It is noted that the aforementioned summary and the following detailed descriptions of the present invention are exemplary and illustrative, rather than being used to limit the scope of the present invention thereto.

BRIEF DESCRIPTION OF THE DRAWINGS

The appended drawings are combined with the present disclosure and form a portion thereof, used to illustrate the embodiments of the present invention and to explain in conjunction with the present disclosure the operation principle of the present invention. The embodiments of the present invention set forth herein are the preferred embodiments for the same; however, it is noted that the present invention is by no means limited to the illustrated configurations and components, wherein:

FIGS. 11A to 11C show diagrams of various pixel unit configurations in accordance with various embodiments of the present invention;

DETAILED DESCRIPTION OF THE PREFERRED EMBODIMENTS

The present invention discloses a stereo image display device and multiple view display device which, without installing any additional optical barrier or lens thereto, is allowed to provide features such as 2D/3D display switching and single/multiple view display switching etc. In order to make the present disclosure more understandable and complete, references are made to detailed descriptions set forth hereinafter in conjunction with drawings as FIGS. 3 to 13. However, it should be appreciated that various devices, components and method steps illustrated in the following embodiments are merely exemplary, rather than being used to limit the scope of the present invention.

Figure 1A:
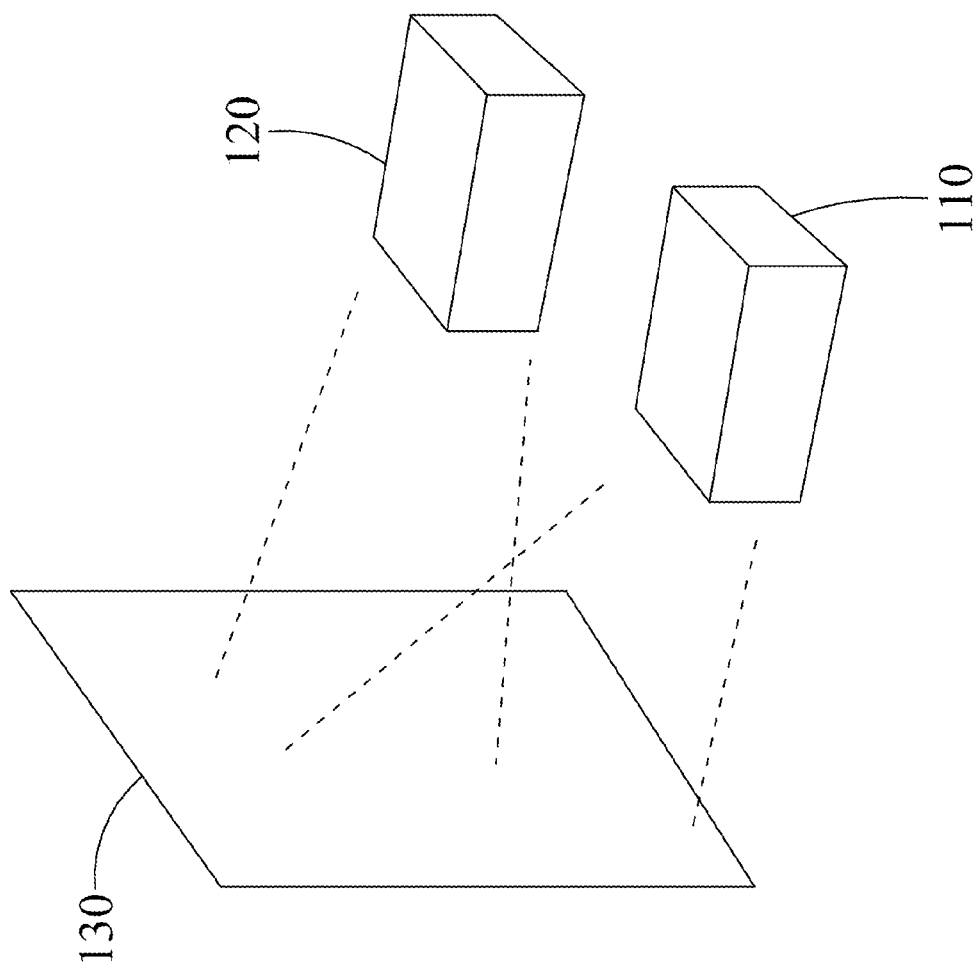
FIGS. 1A and 1B show a stereo display system of the prior art.
Figure 1B:
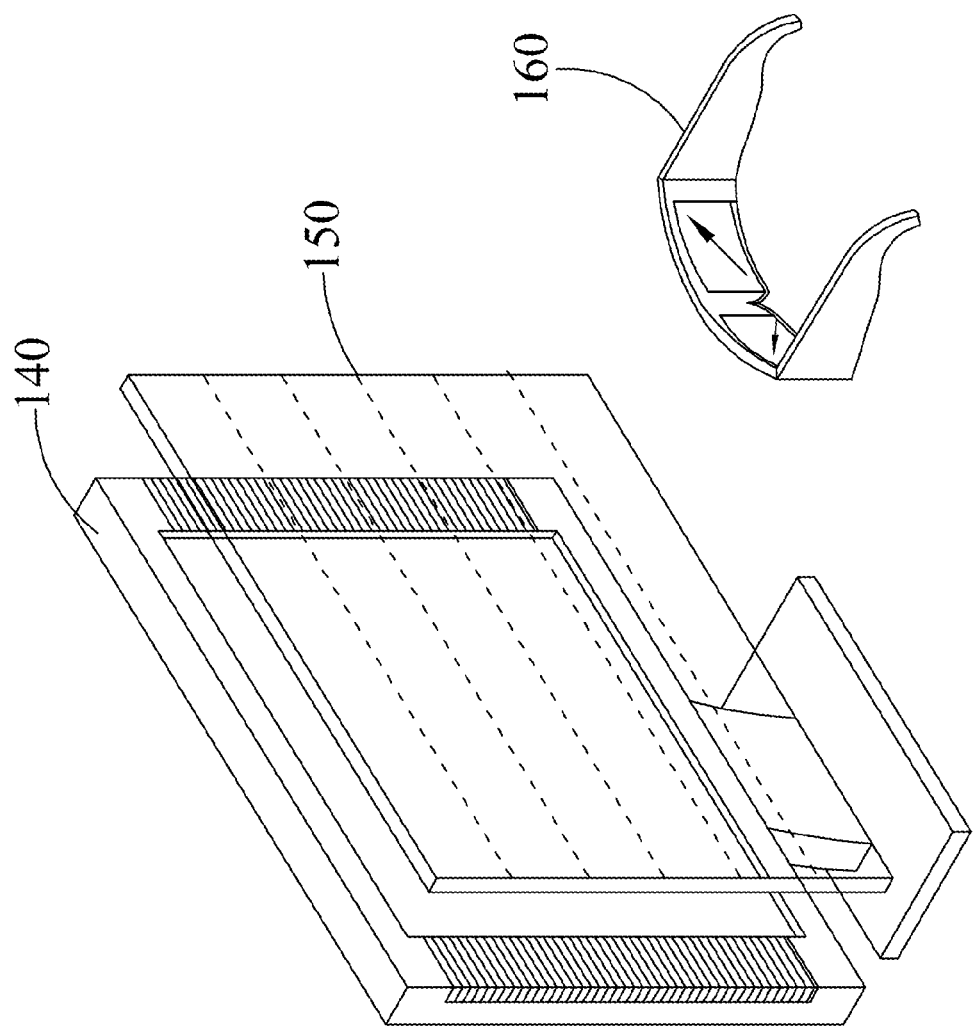
Figure 2A:
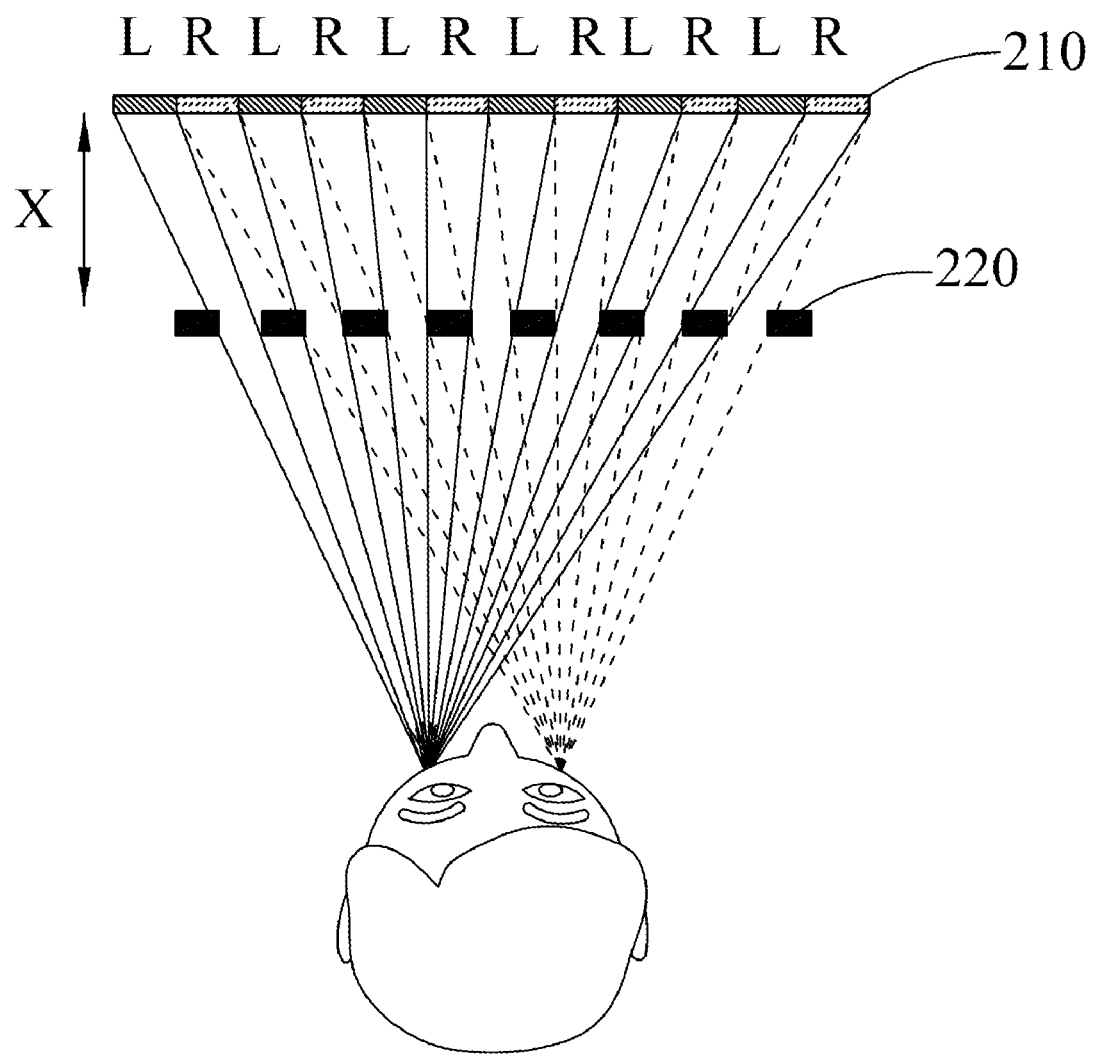
FIGS. 2A and 2B respectively shows a parallax barrier display device and a cylindrical lens display device of the prior art.
Figure 2B:
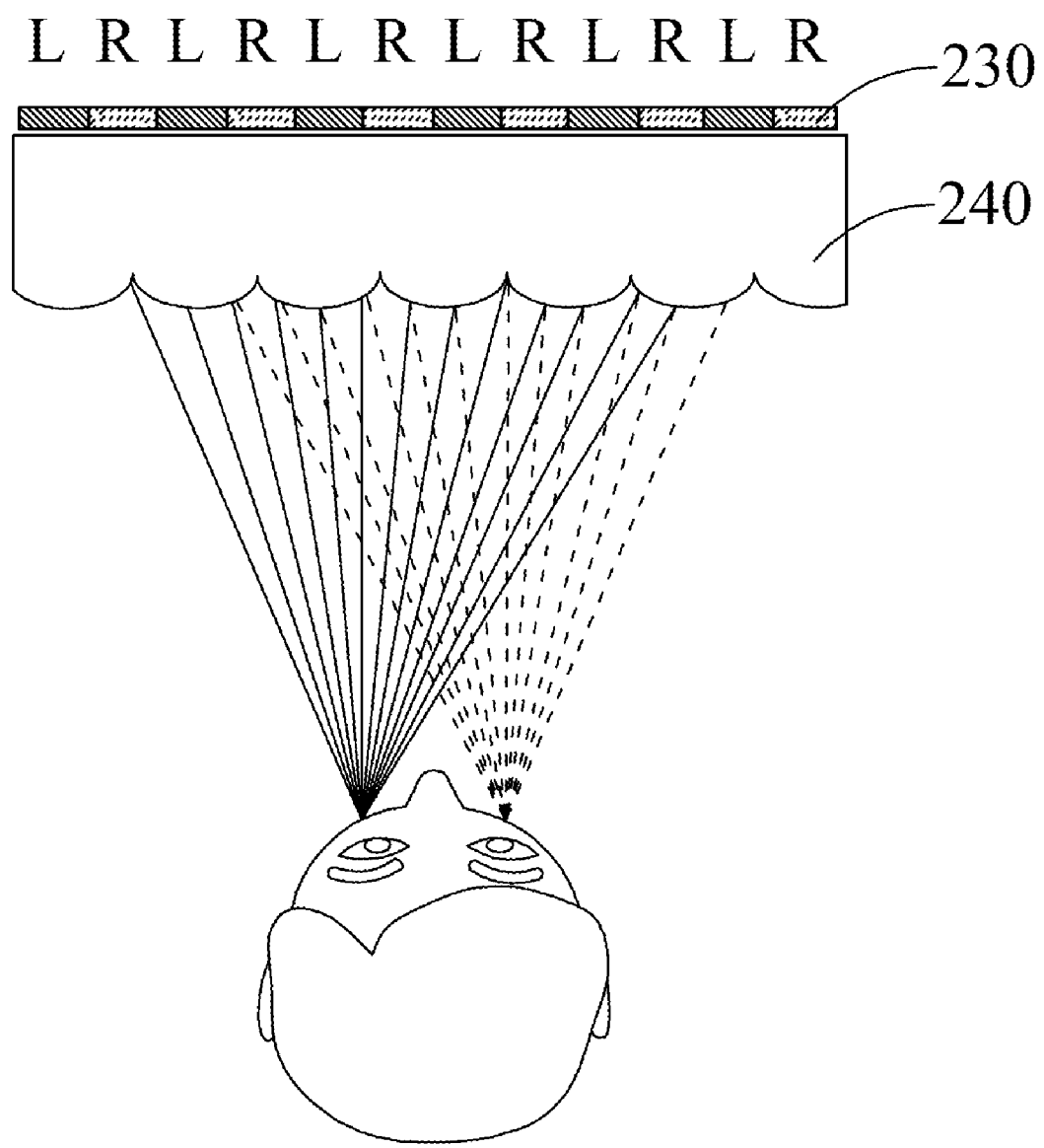
Figure 3:
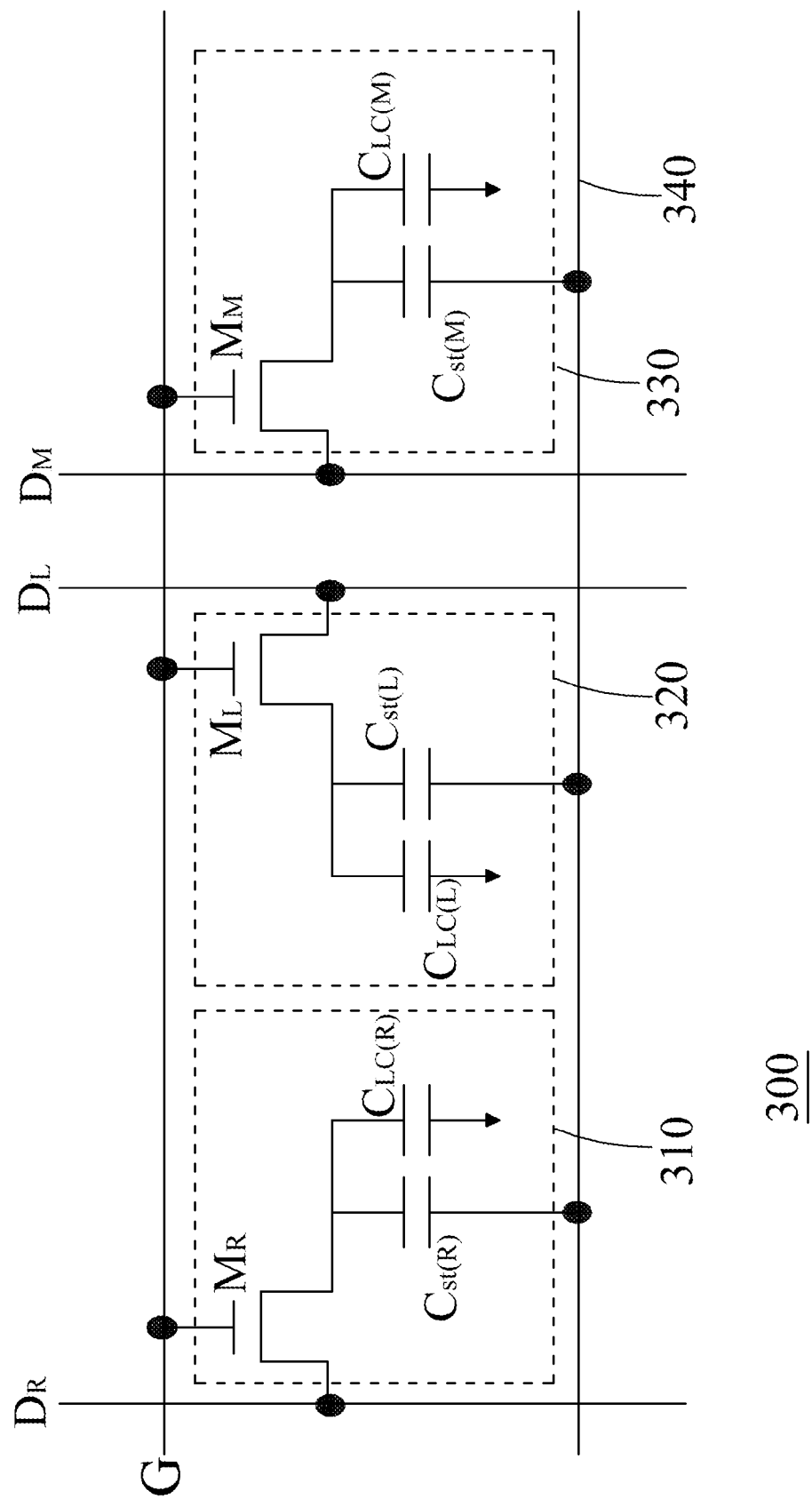
FIG. 3 shows a circuit diagram of an integrated pixel structure in a liquid crystal display device in accordance with an embodiment of the present invention.

FIG. 3 shows a circuit diagram of an integrated pixel structure 300 in a liquid crystal display device in accordance with an embodiment of the present invention. The integrated pixel structure 300 comprises a right sub-pixel unit 310, a left sub-pixel unit 320 and a middle sub-pixel unit 330, which can respectively display an independent image. The right sub-pixel unit 310 comprises a thin-film transistor (TFT) $M_R$, a storage capacitor $C_{st(R)}$ and an LC capacitor $C_{LC(R)}$, in which the drain of the TFT $M_R$ is connected to the data line $D_R$, the gate thereof is connected to the gate line G and the source is connected to the storage capacitor $C_{st(R)}$ and the LC capacitor $C_{LC(R)}$, while one end of the storage capacitor $C_{st(R)}$ being connected to the common ground line 340. When the gate line G initiates the TFT $M_R$, the voltage on the data line DR is transferred to the LC capacitor $C_{LC(R)}$ through the TFT $M_R$, and maintained at a voltage value for a period of time by means of the storage capacitor $C_{st(R)}$. Furthermore, the left sub-pixel unit 320 comprises a TFT $M_L$, a storage capacitor $C_{st(L)}$ and an LC capacitor $C_{LC(L)}$, and the middle sub-pixel unit 330 comprises a TFT $M_M$, a storage capacitor $C_{st(M)}$ and an LC capacitor $C_{LC(M)}$, in which the functions and structures of each component in the left sub-pixel unit 320 and the middle sub-pixel unit 330 are analogous to the counterpart in the right sub-pixel unit 310, thus descriptions thereof are omitted for brevity.

In one embodiment of the present invention, the right sub-pixel unit 310 and the left sub-pixel unit 320 of the integrated pixel structure 300 each respectively has built-in optical components (illustrated as below) which are capable of guiding respectively the light passing through the right sub-pixel unit 310 and the left sub-pixel unit 320 to the right and left sides, thereby generating a stereo image or multiple view image. On the other hand, the path of the light traversing through the middle sub-pixel unit 330 in general does not deflect. Therefore, with such a design composed of the right sub-pixel unit 310 and the left sub-pixel unit 320 in conjunction with the middle sub-pixel unit 330, it is possible to form a 2D/3D switchable display architecture or single/multiple view switchable display architecture.

Figure 4A:
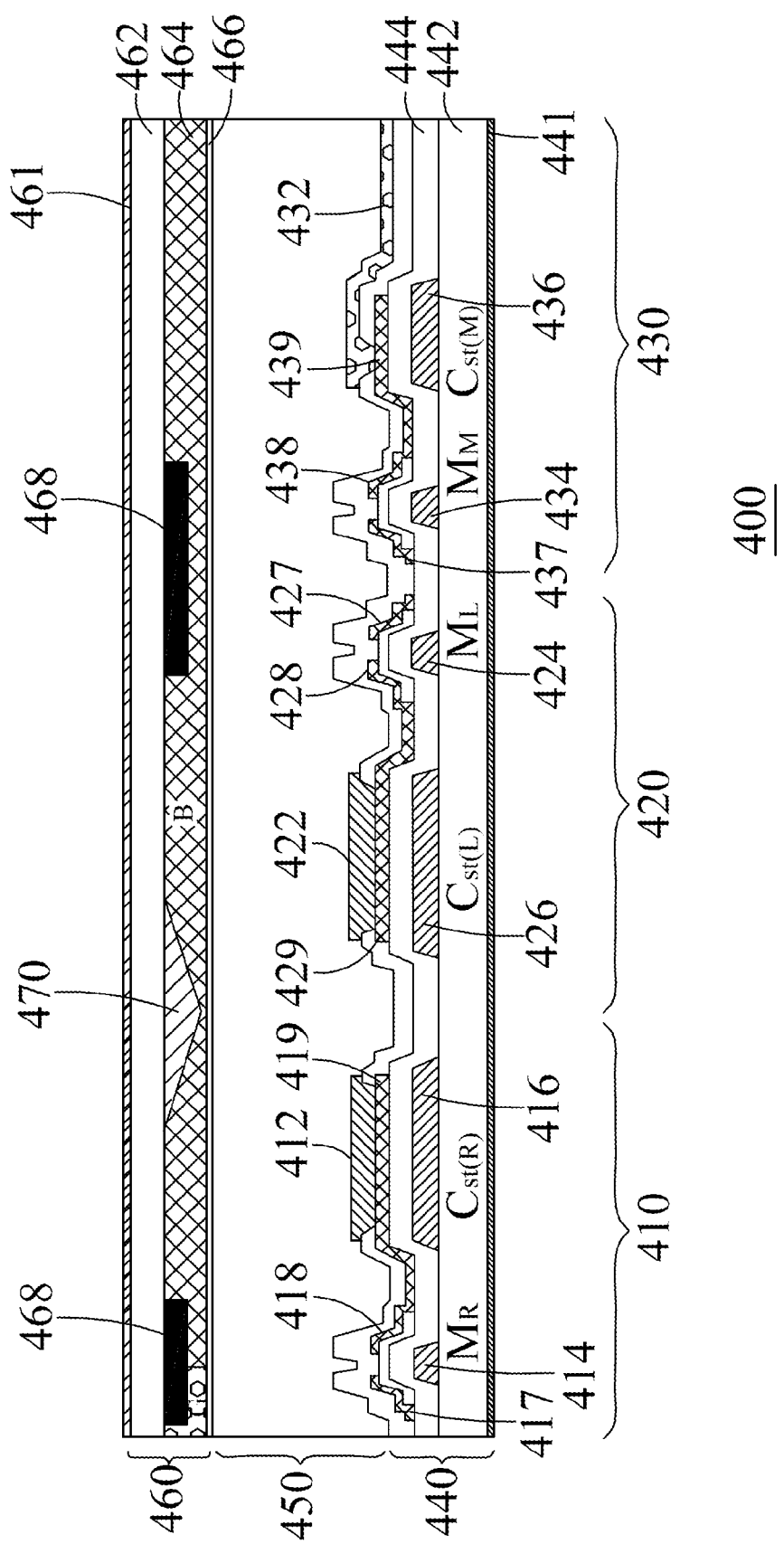
FIGS. 4A and 4B are structural cross-section diagrams of the integrated pixel structure as FIG. 3 in various embodiments of the present invention.
Figure 4B:
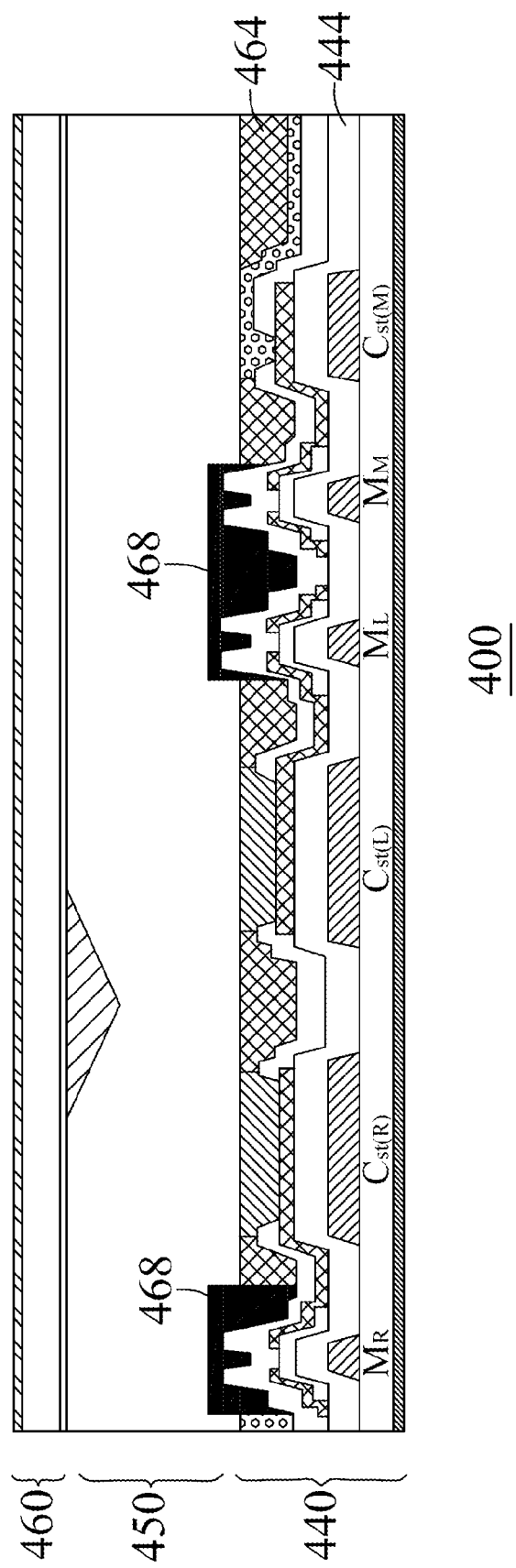

FIGS. 4A and 4B are structural cross-section diagrams of the integrated pixel structure as FIG. 3 in various embodiments of the present invention. Referring to FIG. 4A, the integrated pixel structure 400 is formed by a TFT array substrate 440, a color filter substrate 460 and a liquid crystal layer 450 sandwiched between the said two substrates, and such an integrated pixel structure 400 comprises a right sub-pixel unit 410, a left sub-pixel unit 420 and a middle sub-pixel unit 430. In the TFT array substrate 440, there initially form the gate lines 414, 424, 434 and the common ground lines 416, 426, 436 on a transparent substrate 442, then forms a gate insulator layer 444 to cover the substrate 442, each gate line 414, 424, 434 and each common ground line 416, 426, 436. Next, on both sides of the gate lines 414, 424, 434 there respectively form the drain electrode 417, 427, 437 and the source electrode 418, 428, 438 to create the TFT $M_R$, $M_L$ and $M_M$ as shown in FIG. 3. The drain electrode 417, 427, 437 respectively forms a portion of the data line $D_R$, $D_L$ and $D_M$ as shown in FIG. 3, and the source electrode 418, 428, 438 respectively extends to connect to the conductive electrode 419, 429 and 439, wherein the conductive electrode 419, 429 and 439 respectively, along with the common ground line 416, 426 and 436 as well as a portion of the gate insulator layer 444 sandwiched there between, forms the storage capacitor $C_{st(R)}$, $C_{st(L)}$, $C_{st(M)}$ as FIG. 3. The material used in such electrodes can be any metal of low resistance, e.g. Molybdenum (Mo). Subsequently, in the middle sub-pixel unit 430, there forms a transparent conductive layer 432 (such as Indium Tin Oxide (ITO)) electrically connected to the storage capacitor $C_{st(M)}$. In the right sub-pixel unit 410 and the left sub-pixel unit 420, there on the conductive electrode 419 and 429 respectively forms a reflecting structure 412 and 422, which can be made of Aluminum, Silver, Aluminum Silver alloy, Aluminum and ITO alloy, or any other metal or compound material comprising high reflection coefficient.

The color filter substrate 460 comprises a transparent substrate 462, a dark matrix 468, a RGB color filter layer 464, a common electrode 466 and a light angle control structure 470. In the present embodiment, the position of the light angle control structure 470 corresponds to the boundary between the right sub-pixel unit 410 and the left sub-pixel unit 420, thereby facilitating common use of the control structure by the right sub-pixel unit 410 and the left sub-pixel unit 420. In the right sub-pixel unit 410 and the left sub-pixel unit 420, the light generated by a light source (such as backlight module, not shown) beneath the TFT array substrate 440 will pass through the TFT array substrate 440, the liquid crystal layer 450 and then arrive at the light angle control structure 470. Next, the light angle control structure 470 guides the light respectively to the reflecting structure 412 and 422, and then each light reflects again via the reflecting structure 412 and 422 to left and right sides to allow an observer's left and right eyes (or two observers with each being on left and right side) to individually see an independent image, thereby together forming a stereo image (or a multiple view image). In general, light penetrating the middle sub-pixel unit 430 does not reflect, but directly arrives at the observer's left and right eyes. Besides, the integrated pixel structure 400 may further comprises a polarizer 441 and 461 on each side of the structure, and under general circumstances, the difference of polarization angle between the polarizer 441 and 461 is 90 degrees.

In the present embodiment, the right sub-pixel unit 410 and the left sub-pixel unit 420 together use a common light angle control structure 470; while in other embodiments, the right sub-pixel unit 410 and the left sub-pixel unit 420 each may have its own light angle control structure. The reflecting structure 412 or 422, in design, needs only to operate with the light angle control structure 470 to guide the light to the predetermined direction, and the profile of the reflecting structure 412 or 422 is not restrictive in the present invention. For example, in the embodiment as shown in FIG. 4A, the surface of the reflecting structure 412 is parallel to the transparent substrate 442; while in other embodiments, the surface of the reflecting structure 412 may form a prescribed angle with the transparent substrate 442. Furthermore, suppose the materials used in the conductive electrodes 419 and 429 have high reflection coefficients, then the conductive electrodes 419 and 429 may be also used to reflect light and the reflecting structure 412 or 422 can be thus removed. In particular, it is also possible to modify the configuration of the right sub-pixel unit 410, left sub-pixel unit 420 and middle sub-pixel unit 430 based on the required resolution and aspect ratio in the product; for example, one right sub-pixel unit 410 and one left sub-pixel unit 420 may operate with one middle sub-pixel unit 430, or otherwise two right sub-pixel units 410 and two left sub-pixel units 420 may work conjunctively with one middle sub-pixel unit 430. Besides, if just the 3D, without 2D, display picture is needed, then it is possible as well to include simply the right sub-pixel units 410 and the left sub-pixel units 420, but the middle sub-pixel unit 430 can be omitted.

In another embodiment of the present invention, it is possible to place a dark matrix 468 and a RGB color filter layer 464 on the TFT array substrate 440, as shown in FIG. 4B. Compared with the structure in FIG. 4A, the fabrication process for the color filter substrate 460 is relatively less complicated, and the architecture as FIG. 4B may cause lower light loss during light filtering.

Figure 5A:
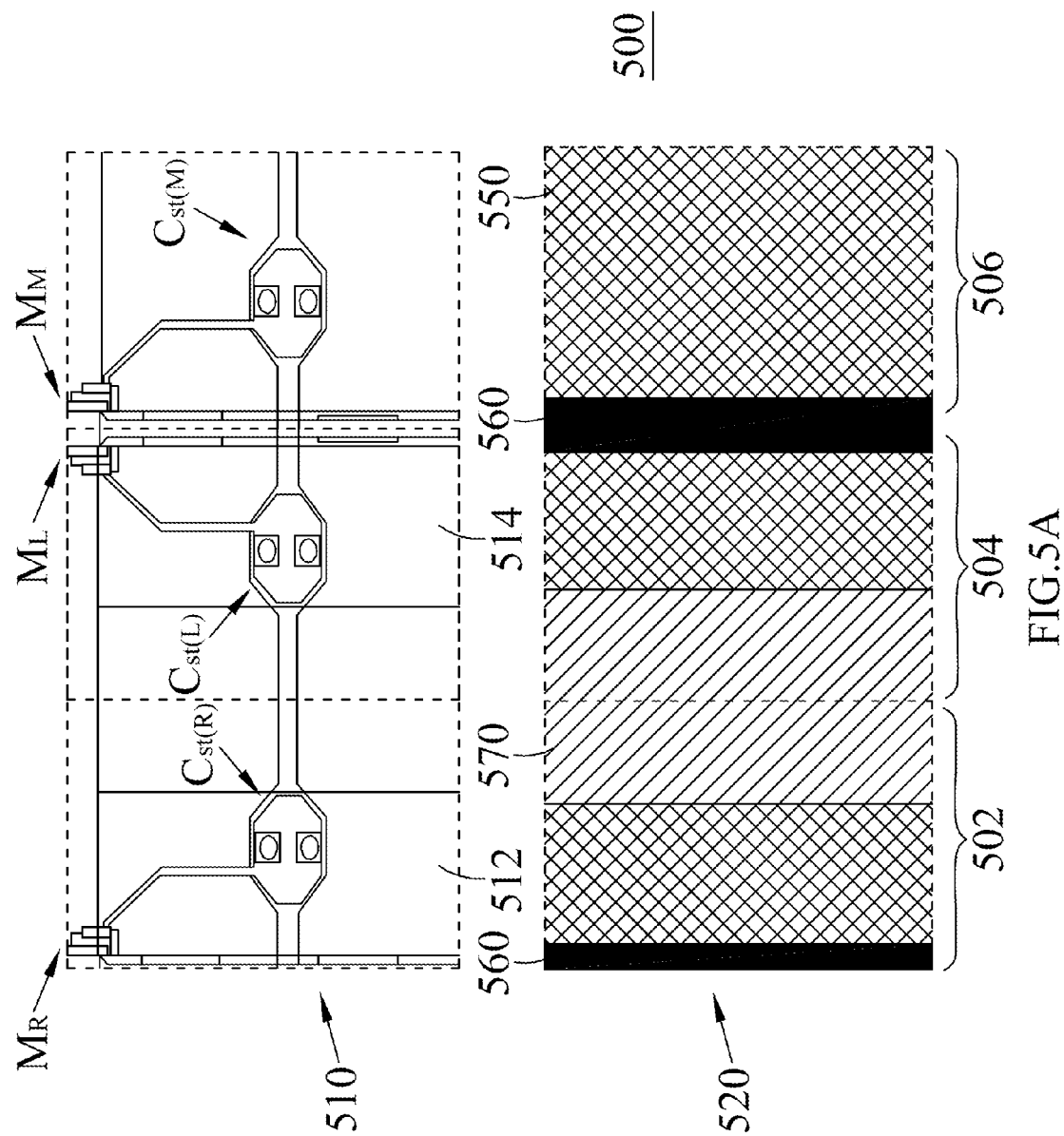
FIGS. 5A and 5B respectively shows the circuit layout of an integrated pixel structure in accordance with various embodiments of the present invention.
Figure 5B:
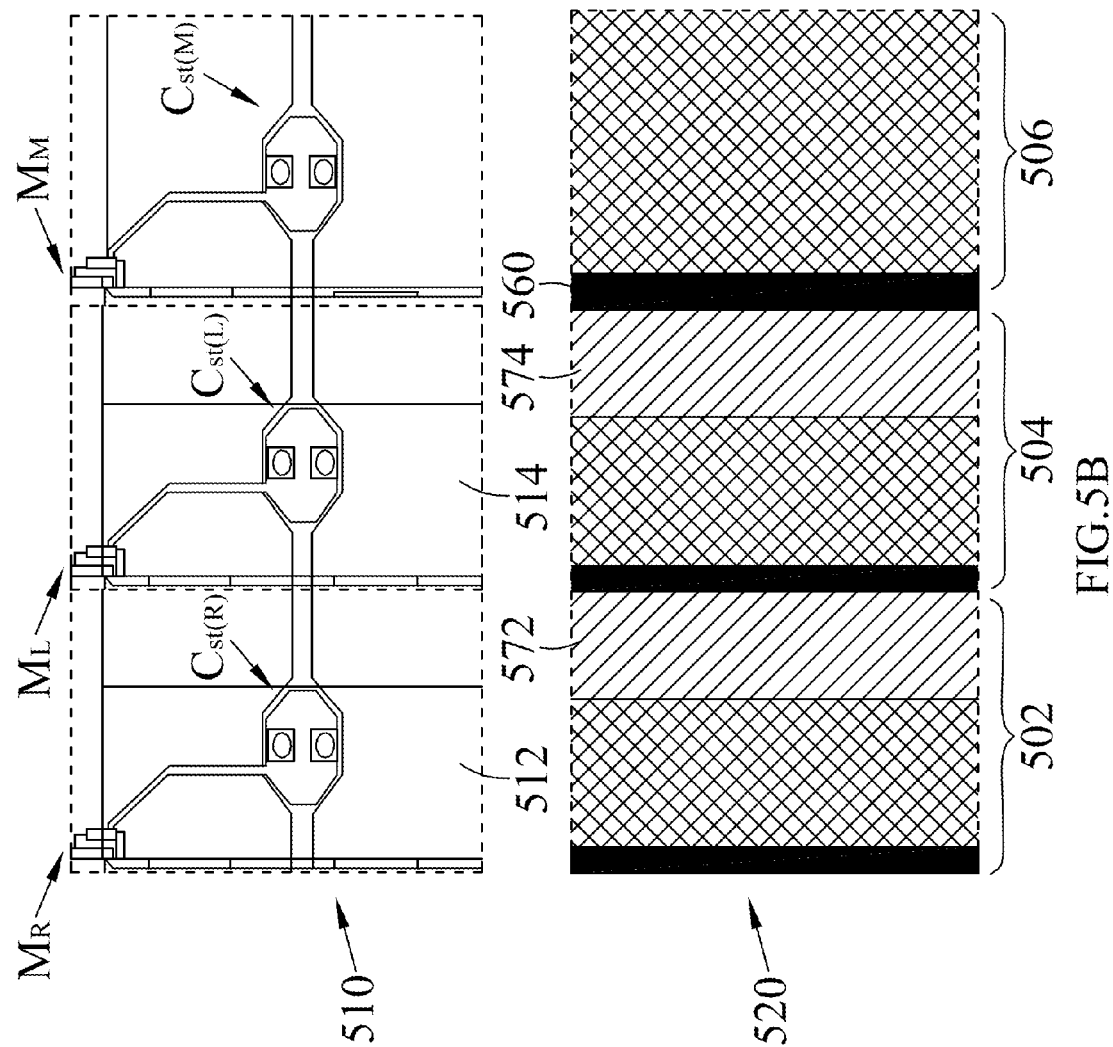

FIGS. 5A and 5B respectively shows the circuit layout of an integrated pixel structure 500 in accordance with various embodiments of the present invention, comprising a TFT array substrate 510 and a color filter substrate 520. Referring to FIG. 5A, the pixel structure 500 comprises a right sub-pixel unit 502, a left sub-pixel unit 504 and a middle sub-pixel unit 506, wherein, in the TFT array substrate 510, the right sub-pixel unit 502 has a TFT $M_R$ and a storage capacitor $C_{st(R)}$, the left sub-pixel unit 504 has a TFT $M_L$ and a storage capacitor $C_{st(L)}$, and the middle sub-pixel unit 506 has a TFT $M_M$ and a storage capacitor $C_{st(M)}$. The right sub-pixel unit 502 and the left sub-pixel unit 504 respectively comprises a reflecting structure (or reflecting electrode) 512 and 514, and the middle sub-pixel unit 506 uses a transparent electrode structure (not shown). The color filter substrate 520 comprises a color filter layer area 550, a dark matrix area 560 and a light angle control structure 570. The equivalent circuit diagram of the integrated pixel structure 500 may be referred to the circuit diagram shown in FIG. 3. In the embodiment shown in FIG. 5A, the right sub-pixel unit 502 and the left sub-pixel unit 504 commonly use the light angle control structure 570. Generally speaking, the light angle control structure 570 is correspondingly disposed to the position not covered by the reflecting structures 512 and 514 in the TFT array substrate 510, which allows the light penetrating the TFT array substrate 510 to arrive at the light angle control structure 570 and then reflect to the reflecting structures 512 and 514. Also, the position of the dark matrix 560 in the color filter substrate 520 respectively corresponds to the position of the TFT $M_R$, TFT $M_L$ and TFT $M_M$, so as to mask the portions designated to block out the light to assure the quality of liquid crystal display.

In another embodiment, referring to FIG. 5B, the right sub-pixel unit 502 and the left sub-pixel unit 504 each has its own independent light angle control structure 572 and 574 which is configured to individually correspond to the position not covered by the reflecting structures 512 and 514 in the TFT array substrate 510. In such an embodiment, the light angle control structure 572 and 574, individually in conjunction with the reflecting structures 512 and 514, respectively guides the light to the same direction, wherein the angles of the light angle control structures 572 and 574, in design, present a small difference. The pixel structure 500 shown in FIG. 5B may be for example located at the edge of the panel, so the right sub-pixel unit 502 and the left sub-pixel unit 504 need to guide the light in the same direction (with a certain angular difference), thereby respectively reaching a viewer's right eye and left eye.

Figure 6:
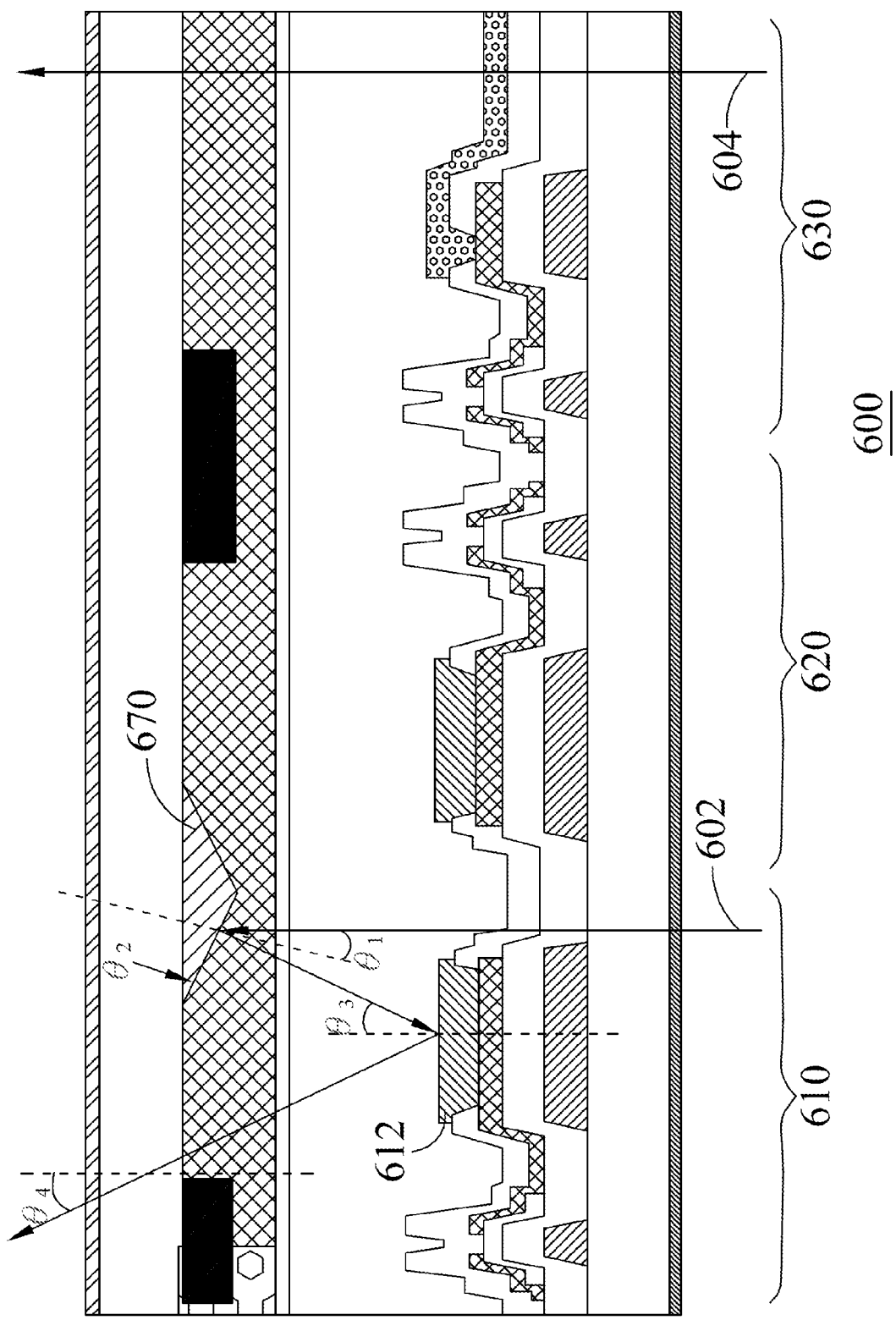
FIG. 6 shows a diagram of light path in an integrated pixel structure in accordance with an embodiment of the present invention.

FIG. 6 shows a diagram of light path in an integrated pixel structure 600 comprising a right sub-pixel unit 610, a left sub-pixel unit 620 and a middle sub-pixel unit 630 in accordance with an embodiment of the present invention. In the right sub-pixel unit 610, light 602 enters into the light angle control structure 670 in a direction vertical to the substrate, and according to the fundamental optical theory, whose incident angle $\theta_1$ is equal to the base angle $\theta_2$ of the light angle control structure 670. Next, the light 602 reflects to the reflecting structure 612, whose incident angle $\theta_3$ relative to the reflecting structure 612 is equal to twice as the $\theta_2$. Then the light 602 further reflects off the pixel structure 600 by the reflecting structure 612 to arrive at a viewer's right eye (or reach an observer located on the right side), whose angle of emergence $\theta_4$ away from the panel is approximately equal to $\theta_3$ (some minor difference between these two angles may exist due to refraction caused by material in each layer). As a result, the angle $\theta_4$ of the light 602 emerging away from the panel is about twice as the base angle $\theta_2$ of the light angle control structure 670; in other word, the proceeding direction of the light 602 can be adjusted through modifying the base angle $\theta_2$ of the light angle control structure 670. On the other hand, in the middle sub-pixel unit 630, light 604 enters in a direction vertical to the substrate, passes through the transparent conductive layer 632, and then leaves from the pixel structure 600 in a direction vertical to the substrate.

Figure 7:
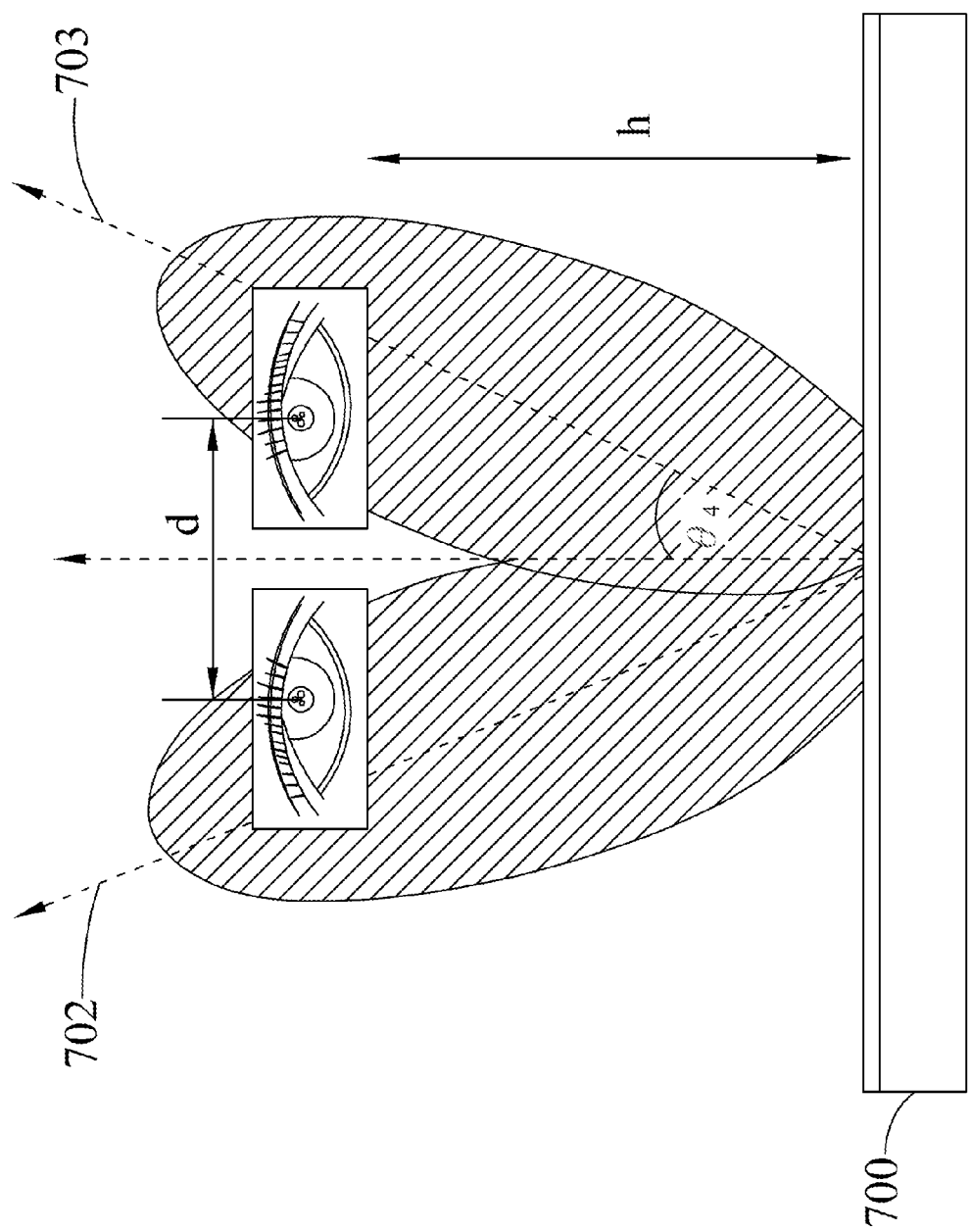
FIG. 7 shows a diagram for a viewable area of a light.

For a display device, light with different proceeding direction can generate different view areas. FIG. 7 shows a diagram for the viewable areas of light 702, 703 leaving from the panel 700 at an angle of emergence $\theta_4$, whose viewable area can be illustrated as the shadowed area with inclined lines in FIG. 7. Referring to FIG. 7, the angle of emergence $\theta_4$ can be determined based on a predetermined view distance, h, and the distance between two eyes (or distance between the left and right viewers), d, wherein $\theta_4$ is generally about $\tan^{-1}(d/h)$.

Figure 8:
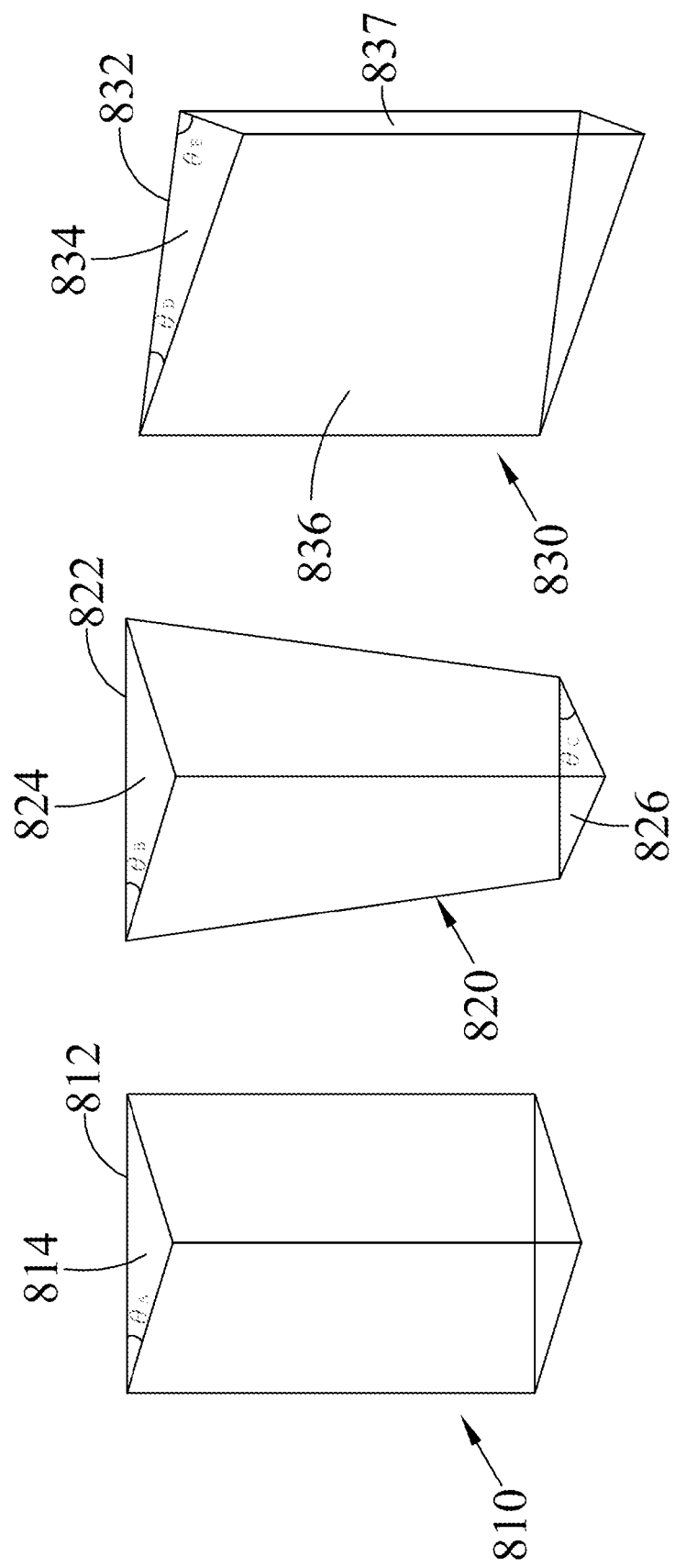
FIG. 8 shows various structures of the light angle control structure as FIGS. 4A and 4B.

FIG. 8 shows various structures 810, 820 and 830 of the light angle control structure 470 as FIGS. 4A and 4B. In one embodiment, the bottom surface 812 of the light angle control structure 810 is in a rectangular shape, whose cross-section 814 presents an isosceles triangle with a base angle $\theta_A$. In general, the left and right sub-pixel units may conjunctively use the light angle control structure 810, allowing the light to respectively exit from the panel at an angle of emergence of twice as the angle $\theta_A$ in both left and right directions (as relevant descriptions in aforementioned FIG. 6). In another embodiment, the bottom surface 822 of the light angle control structure 820 is in a trapezoidal shape, whose cross-sections 824 and 826 both present isosceles triangles, but these cross-sections at different positions have different base angles, as $\theta_B$ and $\theta_C$ shown in the Figure. Compared with the structure 810, the light angle control structure 820 allows the light to exit from the panel at an angle of emergence from twice as the angle $\theta_B$ to twice as the angle $\theta_C$, thereby generating a wider viewable area (also refer to FIG. 7). In yet another embodiment, the bottom surface 832 of the light angle control structure 830 is in a rectangular shape, whose cross-section 834 presents a triangle with base angles $\theta_D$ and $\theta_E$. Generally speaking, the light angle control structure 830 uses only its side surface 836 for light reflection, while the other side thereof 837 is unused, so simply allowing the left sub-pixel unit or the right sub-pixel unit alone to operate, as the light angle control structures 572 and 574 shown in FIG. 5B.

Figure 9A:
FIGS. 9A to 9F illustrate the cross-section diagrams for the process steps of manufacturing a color filter substrate and a light angle control structure in accordance with the present invention.
Figure 9B:
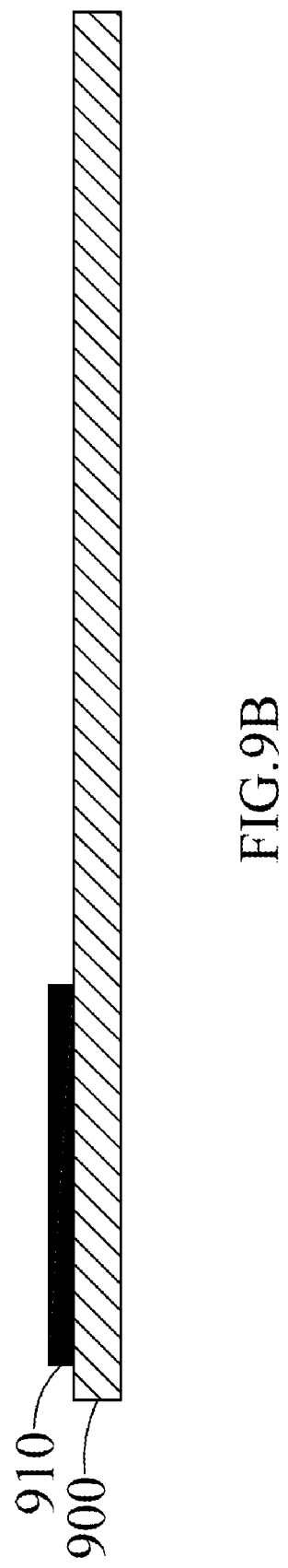
Figure 9C:
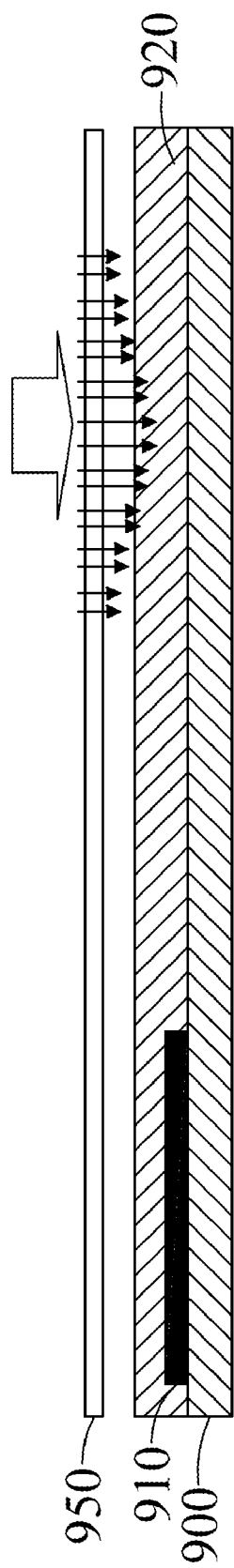
Figure 9D:
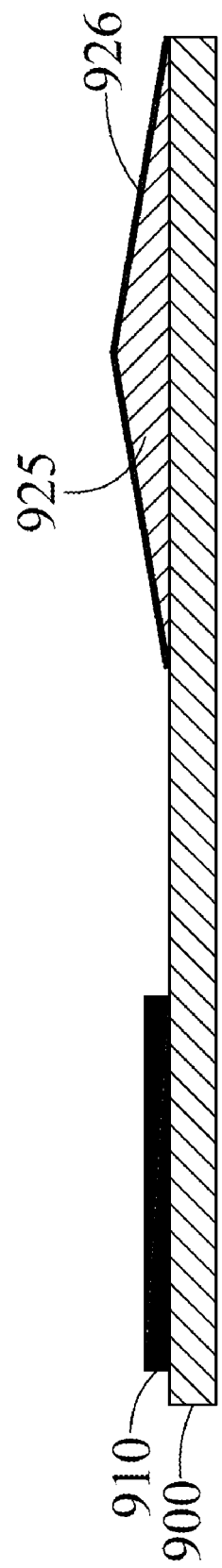
Figure 9E:
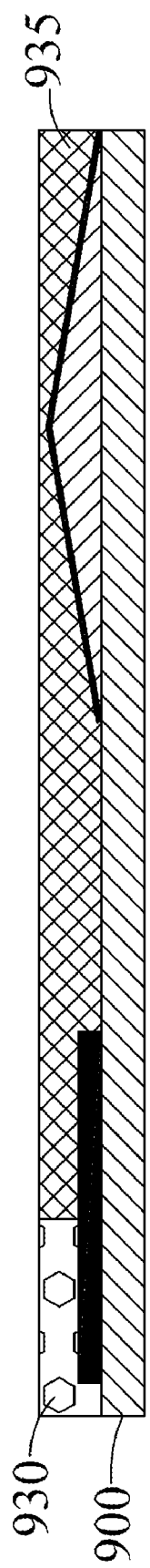
Figure 9F:
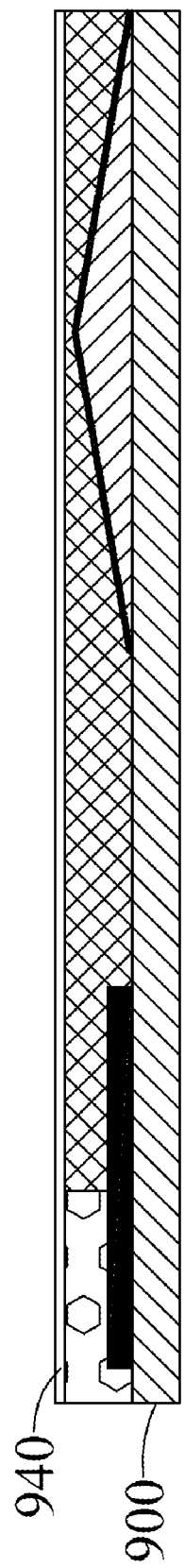

FIGS. 9A to 9F illustrate the cross-section diagrams for the process steps of manufacturing a color filter substrate and a light angle control structure in accordance with the present invention. Initially, refer to FIG. 9A, it provides a transparent substrate 900, e.g. a glass substrate. Next, refer to FIG. 9B, at a predetermined position on the transparent substrate 900 there forms a dark matrix 910 which can be made of materials such as chromium oxide/chromium or organic materials, but not limited thereto. The formation method of the dark matrix 910 may be by using vaporization plating or sputter plating to deposit the chromium oxide/chromium layer, then employing the conventional lithography technology to obtain the required pattern. In general, there may be a plurality of dark matrices 910 formed on the transparent substrate 900, which can be differently arranged according to requirements in various applications. Subsequently, refer to FIG. 9C, it deposits an organic photo-inductive material film 920, then uses a half-tone or a gray-tone mask 950 to expose the organic photo-inductive material film 920. By means of the pattern design presented on the mask 950, it is possible to control the intensity distribution of light passing through the mask 950, thus enabling exposure of different levels on the organic photo-inductive material film 920. Then, after performing developing and baking steps on the exposed organic photo-inductive material film 920, a bump structure 925 with a predetermined profile can be formed, as shown in FIG. 9D. Following this, on the surface of the bump structure 925 there forms a reflecting metal layer 926, whose materials can be various metals of high reflection coefficients (e.g. Silver, Aluminum, Silver-Aluminum alloy and the like), in which the bump structure 925 and the reflecting metal layer 926 represent the above-said light angle control structure (as 470 in FIG. 4A or 670 in FIG. 6). Subsequently, referring to FIG. 9E, on the transparent substrate 900 there form a plurality of color filter layer units consisting of red, green and blue colors distributed in a predetermined matrix, such as the green filter unit 930 and the blue filter unit 935. Besides, materials used in the color filter layer units of different colors can be for example different types of photoresistants, whose formation method may be conventional standard processes such as printing, electro-coating, dying, colorant dispersion and the like. Next, it uses a conductive material (e.g. ITO) to form a common electrode 940, whose formation method may be vaporization plating, sputter plating or other well-known semiconductor deposition methods.

Figure 10A:
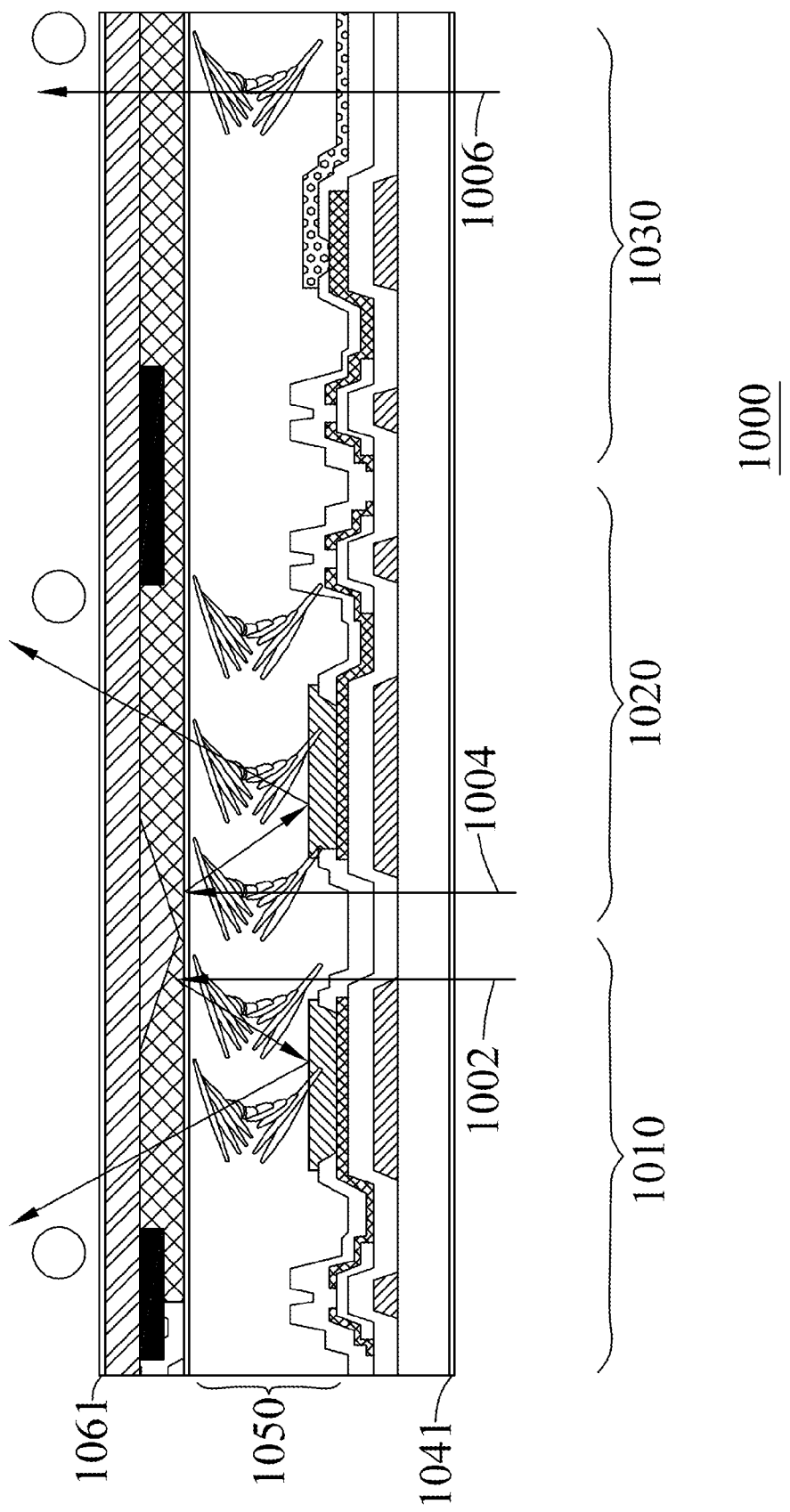
FIGS. 10A and 10B show diagrams for illustrating the operation principle of the pixel structure of the present invention.
Figure 10B:
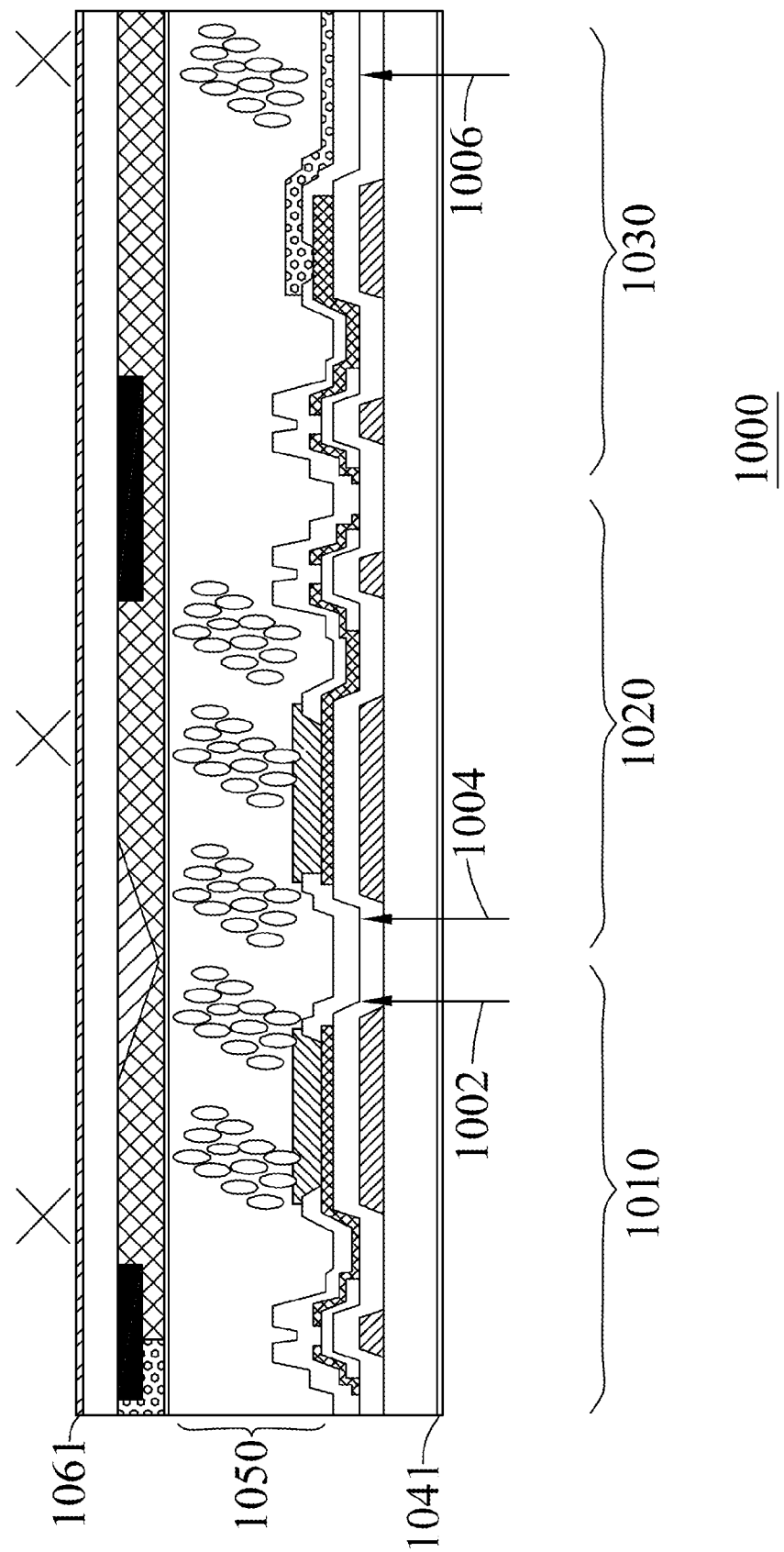

FIGS. 10A and 10B show diagrams for illustrating the operation principle of the pixel structure of the present invention. Referring to FIG. 10A, the pixel structure 1000 comprises a right sub-pixel unit 1010, a left sub-pixel unit 1020 and a middle sub-pixel unit 1030. The structure of each layer in the pixel structure 1000 can be referred to aforementioned relevant descriptions in relation to the pixel structure 400 shown in FIG. 4A. As above, the polarizer 1041 and 1061 is respectively located on each of the two sides on the pixel structure 1000, with a 90-degree difference in polarization angels thereof. To match with such a difference in polarization angel between the polarizers 1041 and 1061, the arrangement of the liquid crystal molecules in the liquid crystal layer 1050 can automatically rotate 90 degrees from top to bottom. With regards to the middle sub-pixel unit 1030, for example, when light 1006 passes through the liquid crystal layer 1050, since the liquid crystal molecules in the liquid crystal layer 1050 have rotated in total 90 degrees, thus when the light 1006 arrives at the polarizer 1061 from the polarizer 1041, the polarization angle in the light 1006 also rotates 90 degrees, and plus the 90 degree difference in the polarization angle between the polarizers 1041 and 1061, so the light 1006 can successfully pass through the pixel structure 1000. On the other hand, for the right sub-pixel unit 1010 and the left sub-pixel unit 1020, light 1002 and 1004 respectively passes through the liquid crystal layer 1050 three times due to two reflections, so when the light 1002 and 1004 arrive at the polarizer 1061 from the polarizer 1041, their polarization directions will rotate 270 degrees, and plus the 90 degree difference in the polarization angle between the polarizers 1041 and 1061, so the light 1002 and 1004 can also accordingly successfully pass through the pixel structure 1000. It is noted that since the light 1002 and 1004 exit from the pixel structure 1000 after two reflections, the intensity thereof will be slightly reduced compared with which of the light 1006.

Referring to FIG. 10B, when a voltage is applied on the top and bottom of the pixel structure 1000, the liquid crystal molecules in the liquid crystal layer 1050 are affected, and the alignment direction thereof tends to be parallel with the direction of the applied electrical field. In other word, influenced by the application of the electrical field, the liquid crystal molecules will not rotate, so the polarization direction of light passing through the liquid crystal molecules does not change. Therefore, after the light 1002, 1004, 1006 passing through the polarizer 1041 and becoming uni-directional polarized light waves, they can not penetrate the polarizer 1061 any longer, as shown in FIG. 10B.

Figure 11A:
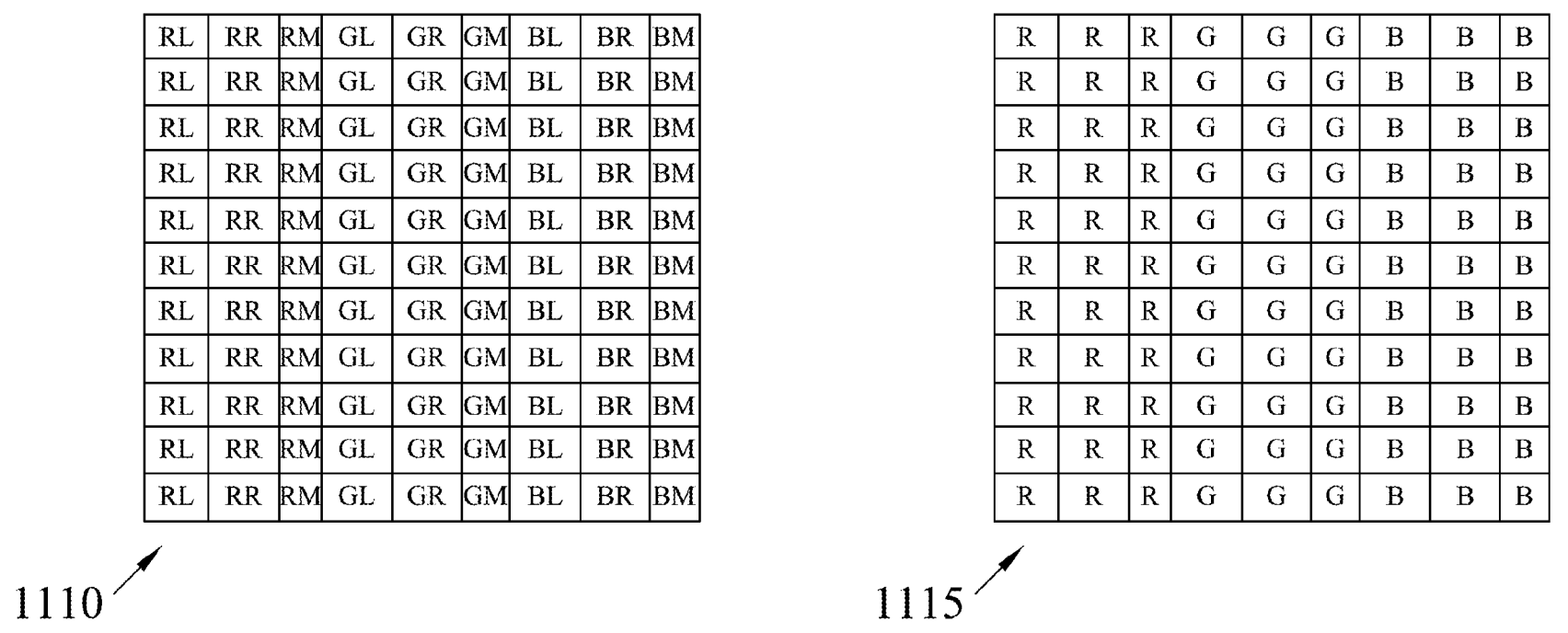
Figure 11B:
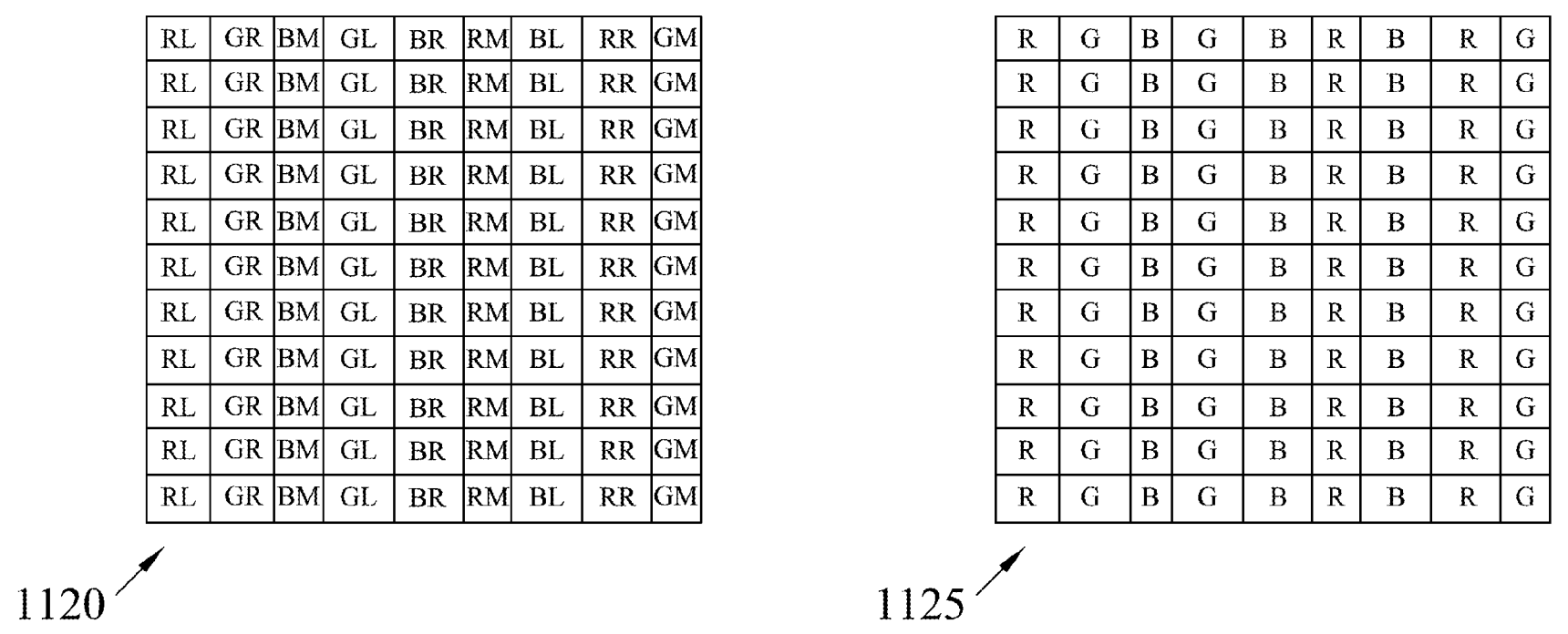
Figure 11C:
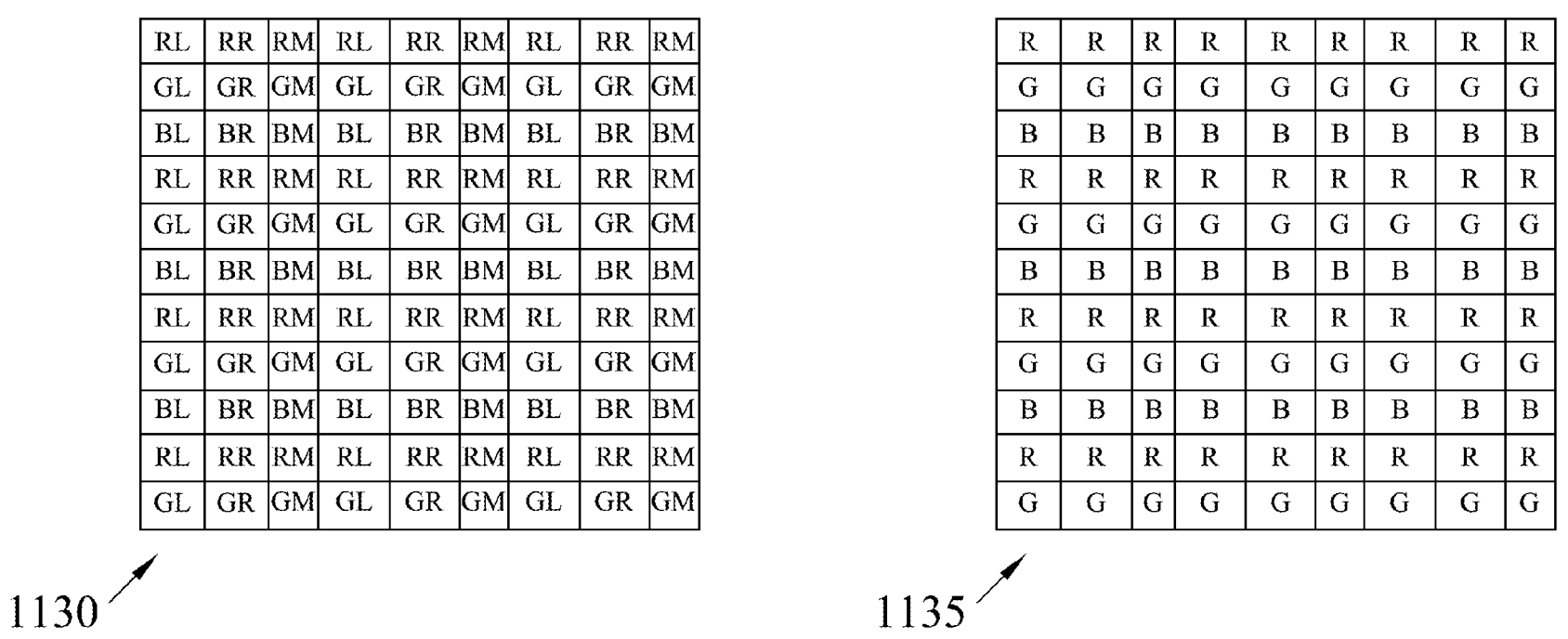

FIGS. 11A to 11C show diagrams of various pixel unit configurations in accordance with various embodiments of the present invention. Referring to FIG. 11A, in the pixel unit configuration 1110, RL, RR, RM respectively indicates red (R) left sub-pixel unit, right sub-pixel unit and middle sub-pixel unit; GL, GR, GM respectively indicates green (G) left sub-pixel unit, right sub-pixel unit and middle sub-pixel unit; and BL, BR, BM respectively indicates blue (B) left sub-pixel unit, right sub-pixel unit and middle sub-pixel unit. In the configuration 1110, the left sub-pixel unit and the right sub-pixel unit for each color are juxtaposed to conjunctively utilize the same light angle control structure to reduce the number of the light angle control structures. Besides, the areas of the left sub-pixel unit and the right sub-pixel of unit are designed to be greater than which of the middle sub-pixel unit, in order to enhance the light intensity from the left sub-pixel unit and the right sub-pixel unit, thereby compensating the loss due to three passes of the light through the liquid crystal layer. When switched to 2D or single view display mode, the left, right and middle sub-pixel units render the same image, as the configuration shown in 1115. FIG. 11B depicts another pixel unit configuration 1120, wherein the arrangements of the red (R), green (G) and blue (B) sub-pixel units are interleaved, and the configuration 1125 indicates the configuration when switched to 2D or single view display mode. Comparing the configuration 1110 with the configuration 1120, the configuration 1110 is simpler in terms of color filter layer fabrication processes with lower manufacture cost, while the configuration 1120 provides more natural pixel arrangement after switched to 2D mode. FIG. 11C shows another pixel unit configuration 1130, wherein the arrangements of the red (R), green (G) and blue (B) sub-pixel units are lateral and interleaved, and the configuration 1135 indicates the configuration when switched to 2D or single view display mode. Referring to FIGS. 11A to 11C, the width of one RGB pixel in the configurations 1110 and 1120 is greater, and the length of one RGB pixel in the configuration 1130 is greater; hence, it is possible to select the arrangement of pixels based on the required aspect ratio for the panel application. Furthermore, according to different product specifications, the numbers and configurations in the left, right and middle sub-pixel units can be correspondingly modified; for example, it is possible to use two right sub-pixel units and two left sub-pixel units to cooperate with one middle sub-pixel units so as to resolve the problem of lower brightness in the right and left sub-pixel unit compared with which of the middle sub-pixel units. Also, in case that 2D display picture is not required, the middle sub-pixel unit can be removed.

Figure 12:
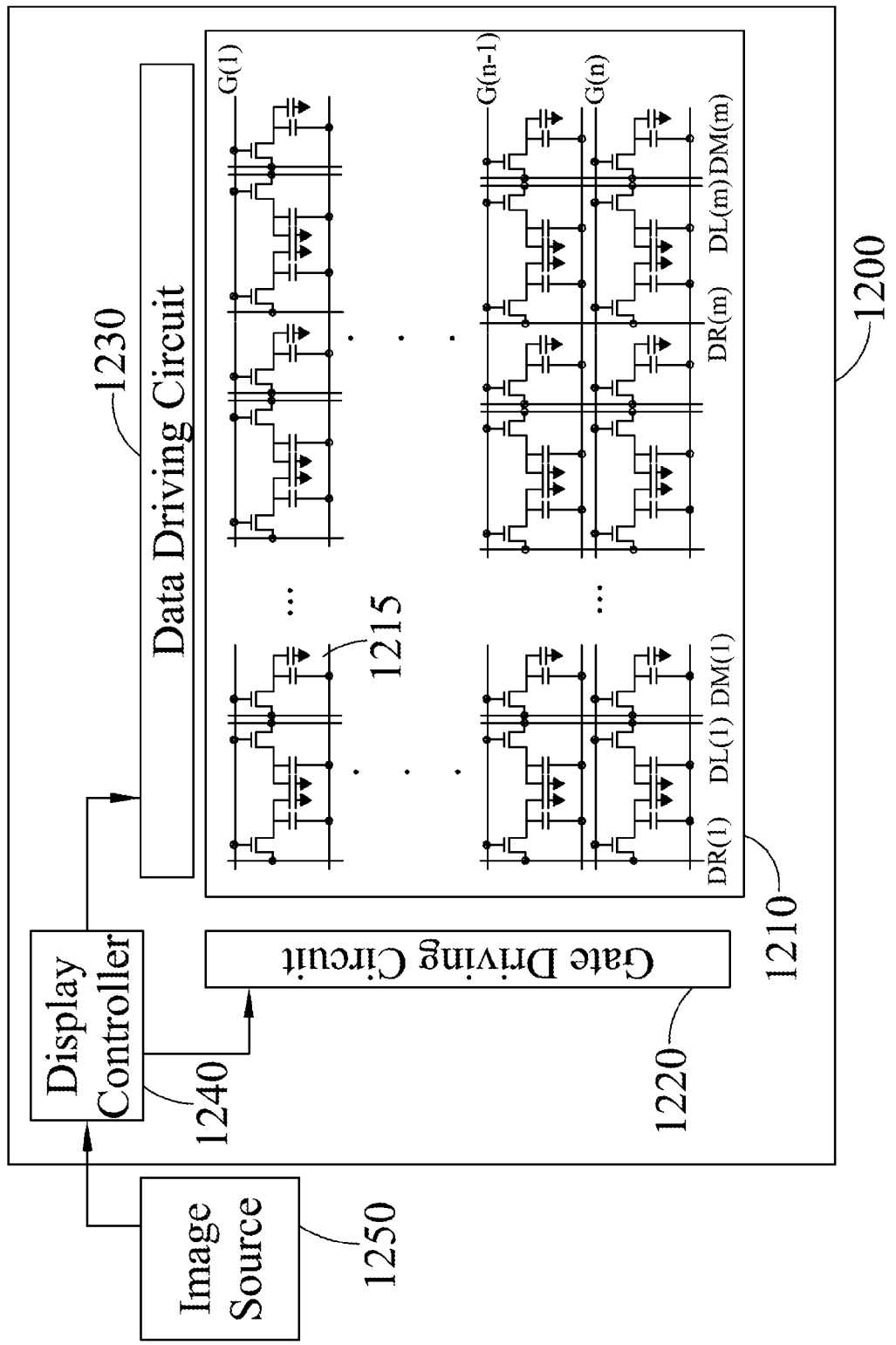
FIG. 12 shows a circuit structure of a stereo liquid crystal display device in accordance with an embodiment of the present invention.

FIG. 12 shows a circuit structure 1200 of a stereo liquid crystal display device in accordance with an embodiment of the present invention, which essentially comprises a liquid crystal panel 1210, a gate driving circuit 1220, a data driving circuit 1230 and a display controller 1240. The liquid crystal panel 1210 comprises a plurality of gate lines G(1)-G(n) and a plurality of data lines DL(1)-DL(m), DR(1)-DR(m) and DM(1)-DM(m). In the present embodiment, each pixel structure 1215 is composed of a right sub-pixel unit, a left sub-pixel unit and a middle sub-pixel unit, and driven by a gate line and three data lines. The gate driving circuit 1220 is configured to input control signals to the gate lines G(1)-G(n) to drive each pixel unit in the pixel structure 1210. The data driving circuit 1230 is configured to transfer display data to each pixel unit via each data line DL(1)-DL(m), DR(1)-DR(m) and DM(1)-DM(m). Through the driving by the gate driving circuit 1220 and data driving circuit 1230, it is allowed to update the display data in all pixel structures of the liquid crystal panel 1210. The display controller 1240 is configured to receive and process raw image signals from the image source 1250, wherein the raw image signals may include left eye image signals, right eye image signals and normal image signals to allow 3D/2D image display. In other embodiments, the raw image signals may comprise left side image signals, right side image signals and middle image signals to allow single/multiple view image display. The image controller 1240 provides features such as time control, frame buffer, view mixer, image engine and the like, which can be composed of conventional circuit components such as buffer, amplifier, analogy-digital converter, linear de-interleaver, resizer and filter etc. The display controller 1240 is respectively connected to the gate driving circuit 1220 and the data driving circuit 1230 to control the outputs of the gate driving circuit 1220 and the data driving circuit 1230 based on the processed image signals, further manipulating the image displayed by each pixel unit.

Figure 13:
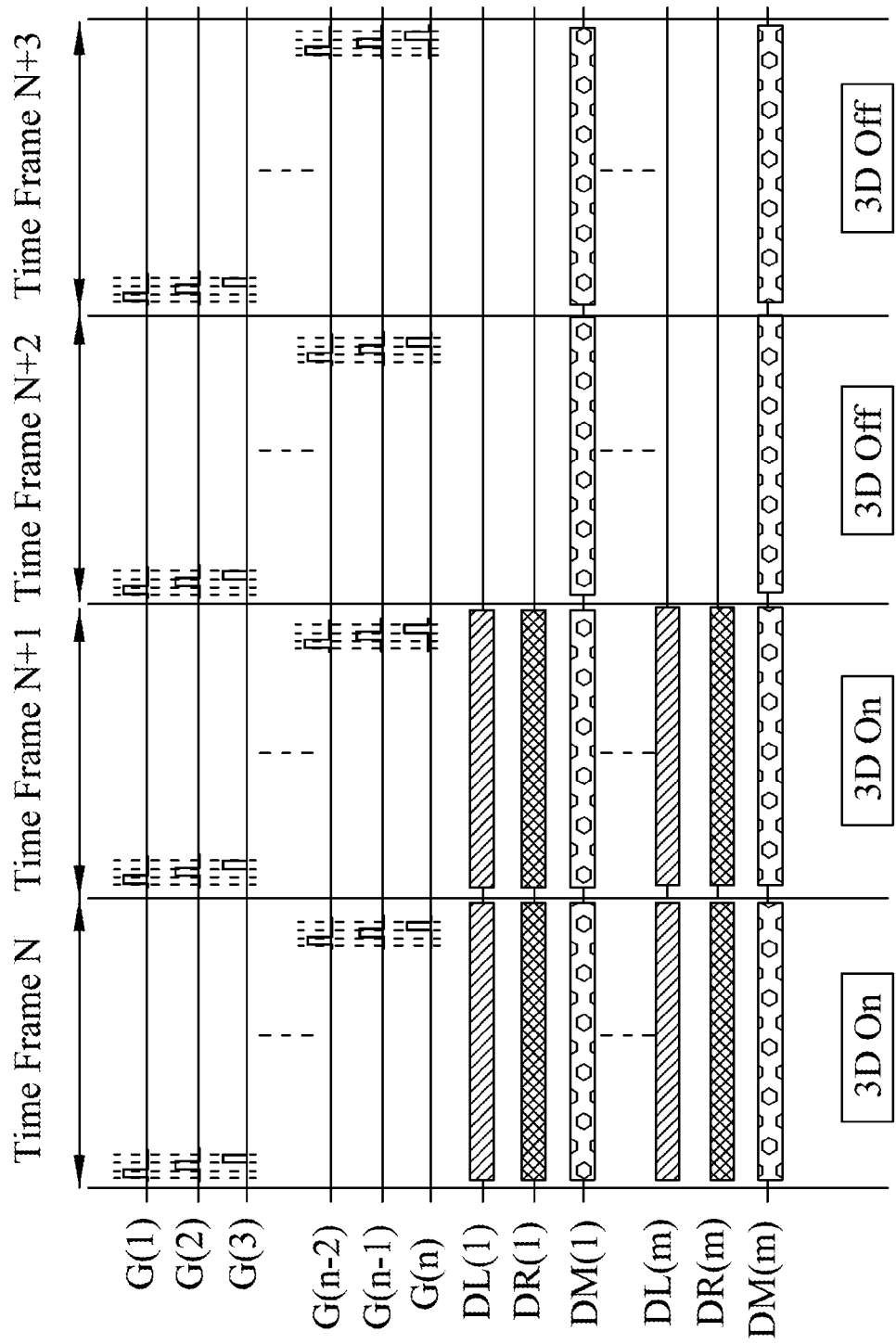
FIG. 13 shows a signal clock diagram on each gate line and each data line in the circuit as FIG. 12.

FIG. 13 shows a signal clock diagram on each gate line and each data line in the circuit as FIG. 12. Referring conjunctively to FIGS. 12 and 13, wherein during each time frame, the gate driving circuit 1220 sequentially inputs n pulses onto the gate lines G(1)-G(n) to start the transistors in each pixel structure. In the present embodiment, the Nth and N+1 th time frames are in 3D display mode, while the N+2 th and N+3 th time frames are in 2D display mode. During the Nth and N+1 th time frames, the data driving circuit 1230 respectively transfers the processed left eye image signals, right eye image signals and normal image signals to the data lines DL(1)-DL(m), DR(1)-DR(m) and DM(1)-DM(m), in order to update the display data in each pixel unit. It is noted that, in the 3D display mode, the data driving circuit 1230 can drive only the data lines DL(1)-DL(m) and DR(1)-DR(m), but not the DM(1)-DM(m), or otherwise, simultaneously drive the data lines DL(1)-DL(m), DR(1)-DR(m) and DM(1)-DM(m) and use the normal image signals transferred via DM(1)-DM(m) as the background signals for the displayed stereo image. Next, during the N+2 th and N+3 th time frames, the data driving circuit 1230 can drive only the data lines DM(1)-DM(m) and transfers the processed normal image signals to the data lines DM(1)-DM(m). In another embodiment, in the 2D display mode, the data driving circuit 1230 may also drive all data lines DL(1)-DL(m), DR(1)-DR(m) and DM(1)-DM(m), and simultaneously transfer the processed normal image signals to all data lines DL(1)-DL(m), DR(1)-DR(m) and DM(1)-DM(m), allowing the left, right and middle sub-pixel units to show the identical image.

It is noted that the circuit structures and clock diagrams described hereinbefore are simply exemplary, rather than being used to limit the present invention thereto. For example, the Nth and N+1 th time frames in FIG. 13 may be in multiple view display mode, while the N+2 th and N+3 th time frames may be in single view display mode. During the Nth and N+1 th time frames, the data driving circuit 1230 respectively transfers the left side image signals, right side image signals and middle side image signals to the data lines DL(1)-DL(m), DR(1)-DR(m) and DM(1)-DM(m), such that viewers individually located at left side, right side and central position can see different images. While during the N+2 th and N+3 th time frames, the data driving circuit 1230 can transfer the middle image signals only to DM(1)-DM(m), and can also simultaneously transfer the middle image signals to the data lines DL(1)-DL(m), DR(1)-DR(m) and DM(1)-DM(m), such that viewers individually located at left side, right side and central position can see identical images. Furthermore, by using the design of different light angle control structures and reflecting structures, the present invention may be also applied in a display device with more than 4 different viewable areas. The reflecting structure and light angle control structure of the present invention can operate conjunctively to guide the light to a predetermined direction, in which the shapes of both two structures can be modified according to actual applications. In addition, the thin-film transistor array substrate can be also substituted by other types of transistors or switch components, such as by alternatively using a Complementary Metal Oxide Semiconductor (CMOS) transistor array substrate.

The present invention is capable of providing features of stereo display and/or multiple view display by means of optical components (e.g. the aforementioned light angle control structure and reflecting structure) built in each left and right sub-pixel units without installing other extra optical structures. As such, the display device according to the present invention has less integral module thickness and weight than which of the conventional architecture, resolving issues concerning no air gaps and color uniformity, offering advantages of desirable slimness and good reliability as well.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A pixel structure, comprising:
   a first substrate;
   a second substrate, substantially parallel with the first substrate and disposed over the first substrate;
   a liquid crystal layer, sandwiched between the first substrate and the second substrate;
   a reflecting structure, disposed on the first substrate; and
   a light angle control structure, disposed on the second substrate;
   wherein the light angle control structure is configured to reflect a light entering from the first substrate to the reflecting structure, and the reflecting structure is configured to reflect the light coming from the light angle control structure such that the light exits from the pixel structure in a predetermined direction;
   wherein the light angle control structure has a surface, the surface forming a first angle $\theta_A$ with the second substrate, the predetermined direction being determined based on the first angle $\theta_A$, predetermined direction forming a second angle $\theta_B$ with the second substrate and the second angle $\theta_B$ being approximately $(90°-2\theta_A)$.

2. The pixel structure according to claim 1, wherein the light angle control structure comprises a reflecting metal layer on the surface, which reflecting metal layer being made of materials including Silver, Aluminum or alloy thereof.

3. The pixel structure according to claim 1, wherein the reflecting structure is made of materials including Aluminum, Silver, Aluminum-Silver alloy or Aluminum-Indium Tin Oxide (ITO) alloy.

4. The pixel structure according to claim 1, wherein the first substrate is a transistor array substrate and the second substrate is a color filter substrate, the pixel structure further comprising:
   a plurality of transistors and a plurality of storage capacitors, disposed on the transistor array substrate;
   a plurality of dark matrices, corresponding to the plurality of transistors and disposed on the color filter substrate; and
   a plurality of color filters, disposed on the color filter substrate.

5. The pixel structure according to claim 4, wherein the transistor array substrate is a thin-film transistor array substrate or a Complementary Metal Oxide Semiconductor (CMOS) transistor array substrate.

6. The pixel structure according to claim 1, wherein the first substrate is a transistor array substrate and the second substrate is a color filter substrate, the pixel structure further comprising:
   a plurality of transistors and a plurality of storage capacitors, disposed on the transistor array substrate;

a plurality of dark matrices, corresponding to the plurality of transistors and disposed on the transistor array substrate; and a plurality of color filters, disposed on the transistor array substrate.

7. The pixel structure according to claim 6, wherein the transistor array substrate is a thin-film transistor array substrate or a Complementary Metal Oxide Semiconductor (CMOS) transistor array substrate.

8. A liquid crystal display device, comprising:
a liquid crystal panel, comprising a plurality of pixel structures as claim 1, a plurality of gate lines and a plurality of data lines;
a display controller, configured to receive and process image signals;
a gate driving circuit, coupled to the display controller and configured to selectively drive the plurality of gate lines based on the processed image signals; and
a data driving circuit, coupled to the display controller and configured to selectively drive the plurality of data lines based on the processed image signals.

9. The liquid crystal display device according to claim 8, wherein the light angle control structure comprises a reflecting metal layer on the surface, which reflecting metal layer being made of materials including Silver, Aluminum or alloy thereof.

10. The liquid crystal display device according to claim 8, wherein the reflecting structure is made of materials including Aluminum, Silver, Aluminum-Silver alloy or Aluminum-Indium Tin Oxide (ITO) alloy.

11. The liquid crystal display device according to claim 8, wherein the first substrate is a transistor array substrate and the second substrate is a color filter substrate, the pixel structure further comprising:
a plurality of transistors and a plurality of storage capacitors, disposed on the transistor array substrate;
a plurality of dark matrices, corresponding to the plurality of transistors and disposed on the color filter substrate; and
a plurality of color filters, disposed on the color filter substrate.

12. The liquid crystal display device according to claim 11, wherein the transistor array substrate is a thin-film transistor array substrate or a Complementary Metal Oxide Semiconductor (CMOS) transistor array substrate.

13. The liquid crystal display device according to claim 8, wherein the first substrate is a transistor array substrate and the second substrate is a color filter substrate, the pixel structure further comprising:
a plurality of transistors and a plurality of storage capacitors, disposed on the transistor array substrate;
a plurality of dark matrices, corresponding to the plurality of transistors and disposed on the transistor array substrate; and
a plurality of color filters, disposed on the transistor array substrate.

14. The liquid crystal display device according to claim 13, wherein the transistor array substrate is a thin-film transistor array substrate or a Complementary Metal Oxide Semiconductor (CMOS) transistor array substrate.

* * * * *